United States Patent
Yang et al.

(10) Patent No.: US 11,848,781 B2
(45) Date of Patent: Dec. 19, 2023

(54) HYBRID AUTOMATIC REPEAT REQUEST ACKNOWLEDGEMENT CODEBOOK DETERMINATION WITH DIFFERENT DOWNLINK ASSIGNMENT INDICATOR BITWIDTH

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/141,659

(22) Filed: Jan. 5, 2021

(65) Prior Publication Data

US 2021/0211237 A1 Jul. 8, 2021

Related U.S. Application Data

(60) Provisional application No. 62/957,764, filed on Jan. 6, 2020.

(51) Int. Cl.
*H04L 1/1607* (2023.01)
*H04L 5/00* (2006.01)
(Continued)

(52) U.S. Cl.
CPC .......... *H04L 1/1678* (2013.01); *H04L 5/0032* (2013.01); *H04L 5/0055* (2013.01); *H04W 72/1273* (2013.01); *H04W 72/23* (2023.01)

(58) Field of Classification Search
CPC ... H04L 1/1614; H04L 1/1678; H04L 1/1861; H04L 1/1896; H04L 5/0032;
(Continued)

(56) References Cited

U.S. PATENT DOCUMENTS 10,341,057 B2 * 7/2019 Shen .................... H04L 1/18
10,404,438 B2 * 9/2019 Park .................... H04B 7/0413
(Continued)

FOREIGN PATENT DOCUMENTS

CN 108293253 A 7/2018
EP 3667981 B1 * 3/2022
(Continued)

OTHER PUBLICATIONS

International Search Report and Written Opinion—PCT/US2021/012249—ISA/EPO—dated Apr. 1, 2021 (201314WO).
(Continued)

*Primary Examiner* — Eric Nowlin
(74) *Attorney, Agent, or Firm* — Holland & Hart LLP

(57) ABSTRACT

Methods, systems, and devices for wireless communications are described. A user equipment (UE) may receive a configuration signal identifying a scheduling constraint for the UE, the scheduling constraint for downlink feedback messages associated with a dynamic codebook configuration and scheduled using a first downlink control information (DCI) format. The UE may receive a first DCI having the first DCI format. The UE may determine, based at least in part on the first DCI format, that the scheduling constraint is satisfied. The UE may transmit a feedback message for the first downlink control information based at least in part on the scheduling constraint being satisfied.

30 Claims, 18 Drawing Sheets

(51) Int. Cl.
*H04W 72/1273* (2023.01)
*H04W 72/23* (2023.01)

(58) Field of Classification Search
CPC .. H04L 5/0055; H04L 5/0094; H04W 72/042; H04W 72/1273; H04W 72/14
See application file for complete search history.

(56) References Cited

U.S. PATENT DOCUMENTS

| | | | |
|---|---|---|---|
| 10,708,897 B2* | 7/2020 | Li | H04W 72/042 |
| 10,887,071 B2* | 1/2021 | Peng | H04L 1/1812 |
| 10,945,256 B2* | 3/2021 | Ugurlu | H04W 72/0446 |
| 11,043,993 B2* | 6/2021 | Yang | H04B 7/0456 |
| 11,050,542 B2* | 6/2021 | Park | H04L 1/0046 |
| 11,147,090 B2* | 10/2021 | Lunttila | H04W 16/14 |
| 11,349,609 B2* | 5/2022 | Bhattad | H04L 1/1858 |
| 11,451,339 B2* | 9/2022 | Papasakellariou | H04L 5/0091 |
| 11,558,894 B2* | 1/2023 | Vangala | H04W 72/1268 |
| 2017/0134140 A1* | 5/2017 | Park | H04L 1/1887 |
| 2017/0366305 A1* | 12/2017 | Hwang | H04L 5/0055 |
| 2018/0241510 A1* | 8/2018 | Shen | H04L 1/1812 |
| 2018/0376490 A1* | 12/2018 | Lunttila | H04W 16/14 |
| 2019/0132824 A1 | 5/2019 | Jeon et al. | |
| 2019/0141727 A1* | 5/2019 | Si | H04L 1/1887 |
| 2019/0356456 A1* | 11/2019 | Park | H04L 5/0055 |
| 2019/0363840 A1 | 11/2019 | Wang et al. | |
| 2020/0044791 A1* | 2/2020 | Tsai | H04W 72/0413 |
| 2020/0127771 A1* | 4/2020 | Papasakellariou | H04L 5/001 |
| 2020/0127773 A1* | 4/2020 | Papasakellariou | H04L 5/0091 |
| 2020/0145138 A1* | 5/2020 | Bhattad | H04L 1/1861 |
| 2020/0177352 A1* | 6/2020 | Peng | H04L 1/1854 |
| 2020/0358487 A1* | 11/2020 | Yang | H04L 1/1819 |
| 2020/0374045 A1* | 11/2020 | Yin | H04B 7/0456 |
| 2021/0111852 A1* | 4/2021 | Peng | H04L 5/0055 |
| 2021/0234643 A1* | 7/2021 | Wang | H04L 1/1822 |
| 2021/0336726 A1* | 10/2021 | Takeda | H04W 72/1289 |
| 2021/0345305 A1* | 11/2021 | Takeda | H04L 5/0094 |
| 2022/0022237 A1* | 1/2022 | Kim | H04L 5/0055 |
| 2022/0201724 A1* | 6/2022 | Zhang | H04L 5/1469 |
| 2022/0201757 A1* | 6/2022 | Cruz | H04L 5/0053 |
| 2022/0209924 A1* | 6/2022 | Yang | H04L 1/1854 |
| 2022/0272673 A1 | 8/2022 | Yang et al. | |
| 2022/0303065 A1* | 9/2022 | Hosseinian | H04W 72/1289 |
| 2022/0303979 A1* | 9/2022 | Li | H04W 72/0446 |
| 2022/0377776 A1* | 11/2022 | Choi | H04W 24/08 |

FOREIGN PATENT DOCUMENTS

| | | | | |
|---|---|---|---|---|
| JP | 2021526765 A | * | 10/2021 | |
| KR | 20210006965 A | * | 1/2021 | |
| TW | 202029679 A | * | 8/2020 | |
| WO | 2018222099 A1 | | 12/2018 | |
| WO | WO-2020001134 A1 | * | 1/2020 | |
| WO | WO-2020096910 A1 | * | 5/2020 | |
| WO | WO-2020214376 A1 | * | 10/2020 | H04L 1/003 |

OTHER PUBLICATIONS

Moderator (Huawei): "Email Discussion/Approval [101-e-NR-L1enh-URLLC-PDCCH Enhancements-01] on Remaining Issues on DCI Format Design and Proposed Conclusion #1", 3GPP Draft, 3GPP TSG RAN WG1 Meeting #101-e, R1-2005059, 3rd Generation Partnership Project (3GPP), Mobile Competence Centre, 650, Route Des Lucioles, F-06921 Sophia-Antipolis Cedex, France, vol. RAN WG1. No. E-Meeting, May 25, 2020-Jun. 5, 2020, Jun. 9, 2020 (Jun. 9, 2020), XP051895265, 65 Pages, Retrieved from the Internet: URL: https://ftp.3gpp.org/tsg_ran/WG1_RL1/TSGR1_101-e/Docs/R1-2005059.zip. R1-2005059. Summary #5 of Email Discussion [101-e-NR-L1enh-URLLC-PDCCH Enhancements-01] on Remaining Issues on DCI Format Design.docx [Retrieved on Jun. 9, 2020] p. 40-p. 42 p. 29-p. 32.

* cited by examiner

[a1,a2,a3,a4]  [b1,b2,b3,b4,b5,b6]

[a1,a2,a3,a4,b1,b2,b3,b4,b5,b6]
Concatenated Table

DCI Format 1_2
305

DCI Format 1_1/1_0
310

HYBRID AUTOMATIC REPEAT REQUEST ACKNOWLEDGEMENT CODEBOOK DETERMINATION WITH DIFFERENT DOWNLINK ASSIGNMENT INDICATOR BITWIDTH

CROSS REFERENCE

The present Application for Patent claims the benefit of U.S. Provisional Patent Application No. 62/957,764 by YANG et al., entitled "HYBRID AUTOMATIC REPEAT/REQUEST-ACKNOWLEDGEMENT CODEBOOK DETERMINATION WITH DIFFERENT DOWNLINK ASSIGNMENT INDICATOR BITWIDTH," filed Jan. 6, 2020, assigned to the assignee hereof, and expressly incorporated by reference herein.

BACKGROUND

The following relates generally to wireless communications, and more specifically to hybrid automatic repeat/request-acknowledgement (HARQ-ACK) codebook determination with different downlink assignment indicator (DAI) bitwidth.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support hybrid automatic repeat/request-acknowledgement (HARQ-ACK) codebook determination with different downlink assignment indicator (DAI) bitwidth. Broadly, aspects of the described various techniques support HARQ-ACK codebook design in the situation where the size (e.g., the number of bits) of the DAI conveyed in downlink control information (DCI) grants vary. In particular, the described techniques provide multiple solutions that avoid such mismatch and/or provide techniques for a user equipment (UE) and/or base station to implement when the mismatch occurs.

One example solution is a scheduling constraint-based solution. In particular, the base station may configure the UE with the scheduling constraint by transmitting a configuration signal to the UE (e.g., a radio resource control (RRC) signal). Broadly, the scheduling constraint may be for downlink transmissions scheduled with a dynamic codebook configuration (e.g., a HARQ type-2 codebook) which are scheduled using a first DCI format, e.g., DCI format 1_2. The base station may transmit a first DCI to the UE scheduling a first downlink transmission using the first DCI format. The UE may determine that, since the first DCI uses the first DCI format and/or that the downlink transmission uses the type-2 HARQ codebook, that the first downlink transmission satisfies the scheduling constraint. Accordingly, the UE may monitor for the first downlink transmission from the base station and transmit a feedback message for the first downlink transmission based on the monitoring. When the first downlink transmission scheduled by the first DCI corresponds to a semi-persistent resource release, the UE and/or base station may release the semi-persistent resources. When the first downlink transmission scheduled by the first DCI corresponds to a secondary cell dormancy indication, the UE and/or base station may transition the secondary cell(s) indicated in the first DCI to a dormancy state.

Another example solution may include the UE concatenating two separate codebooks to derive a joint codebook for transmission. For example, the UE may receive first DCI grant(s) scheduling corresponding first downlink transmission(s), with each first DCI grant having a unique DAI counter. The UE may also receive second DCI grant(s) scheduling corresponding second downlink transmission(s), with each of the second DCI grants having a unique DAI counter. The UE may generate a concatenated codebook for a feedback message based on the DAI counters in each of the first DCIs and the DAI counters in each of the second DCIs. Accordingly, the UE may transmit the feedback message for the first and second downlink transmissions that carries or otherwise conveys the indication of the concatenated codebook.

Another example solution may include the UE utilizing one codebook in a joint feedback message. For example, the UE may generate a codebook for DCI(s) received during control channel monitoring occasions configured for the UE. The UE may generate the codebook based on the DCIs having the first DCI format (e.g., DCI formats 1_1/1_0. The UE may determine or otherwise detect negative-acknowledgment (NACK) bit(s) in the codebook that is situated between two HARQ-ACK bits. The UE may determine that a DCI having a second DCI format (e.g., DCI format 1_2) was received during a control channel monitoring occasion corresponding to the NACK bit (e.g., between control channel monitoring occasions corresponding to the two HARQ-ACK bits). The UE may update the codebook based on this determination and then transmit a feedback message to the base station indicating the updated codebook. For example, the UE may replace, in some examples, the NACK bit with a HARQ-ACK bit (e.g., based on the decoding result of the second DCI).

In another example solution, the UE may receive first DCI(s), with each first DCI having the first DCI format (e.g., DCI formats 1_1/1_0) and a first DAI value based on a first modulo operator (e.g., modulo four). The UE may also receive second DCI(s), with each second DCI having a second DCI format (e.g., DCI format 1_2) and a second DAI value based on a second modulo operator (e.g., modulo two). For each of the received first DCI(s), the UE may perform a conversion operation on the corresponding first DAI value to change the modulo operator from the first modulo operator to a second modulo operator (e.g., from modulo four to modulo two). Accordingly, the UE may generate a codebook based on the conversion operation (e.g., using the modulo two) and transmit a feedback message to the base station indicating the codebook.

A method of wireless communication at a UE is described. The method may include receiving a configuration signal identifying a scheduling constraint for the UE, the scheduling constraint for downlink feedback messages associated with a dynamic codebook configuration and scheduled using a first DCI format, receiving a first DCI having the first DCI format, determining, based on the first DCI format, that the scheduling constraint is satisfied, and transmitting a feedback message for the first DCI based on the scheduling constraint being satisfied.

An apparatus for wireless communication at a UE is described. The apparatus may include a processor, memory coupled with the processor, and instructions stored in the memory. The instructions may be executable by the processor to cause the apparatus to receive a configuration signal identifying a scheduling constraint for the UE, the scheduling constraint for feedback messages associated with a dynamic codebook configuration and scheduled using a first DCI format, receive a first DCI having the first DCI format, determine, based on the first DCI format, that the scheduling constraint is satisfied, and transmit a feedback message for the first DCI based on the scheduling constraint being satisfied.

Another apparatus for wireless communication at a UE is described. The apparatus may include means for receiving a configuration signal identifying a scheduling constraint for the UE, the scheduling constraint for feedback messages associated with a dynamic codebook configuration and scheduled using a first DCI format, receiving a first DCI having the first DCI format, determining, based on the first DCI format, that the scheduling constraint is satisfied, and transmitting a feedback message for the first DCI based on the scheduling constraint being satisfied.

A non-transitory computer-readable medium storing code for wireless communication at a UE is described. The code may include instructions executable by a processor to receive a configuration signal identifying a scheduling constraint for the UE, the scheduling constraint for feedback messages associated with a dynamic codebook configuration and scheduled using a first DCI format, receive a first DCI s having the first DCI format, determine, based on the first DCI format, that the scheduling constraint is satisfied, and transmit a feedback message for the first downlink control information based on the scheduling constraint being satisfied.

Some examples of the method, apparatuses, and non-transitory computer-readable medium described herein may further include operations, features, means, or instructions for identifying a size configuration for a counter DAI in the first DCI format includes a zero-bit downlink assignment counter.

Some examples of the method, apparatuses, and non-transitory computer-readable medium described herein may further include operations, features, means, or instructions for receiving a second DCI having the first DCI format, determining, based on the second DCI, that a first feedback message for the first DCI may be multiplexed with a second feedback message for the second DCI, determining, based on the first DCI format of the first DCI, that the second DCI does not satisfy the scheduling constraint, and determining, based on the second DCI not satisfying the scheduling constraint, that a scheduling error may have occurred.

Some examples of the method, apparatuses, and non-transitory computer-readable medium described herein may further include operations, features, means, or instructions for receiving a second DCI, determining, based on the second DCI, that a first feedback message for the first DCI may be multiplexed with a second feedback message for the second DCI, determining, based on the first DCI format of the first DCI, that the second DCI does not satisfy the scheduling constraint, and determining, based on the second DCI not satisfying the scheduling constraint, that a scheduling error may have occurred.

Some examples of the method, apparatuses, and non-transitory computer-readable medium described herein may further include operations, features, means, or instructions for receiving a second DCI, determining, based on the second DCI, that the feedback message for the first DCI and a second feedback message for the second DCI are to be transmitted separately, and transmitting the feedback message for the first DCI and the second feedback message for the second DCI based on based on the first DCI and the second DCI satisfying a scheduling constraint.

In some examples of the method, apparatuses, and non-transitory computer-readable medium described herein, a size configuration for a counter DAI in the first DCI format include a one-bit downlink assignment counter.

Some examples of the method, apparatuses, and non-transitory computer-readable medium described herein may further include operations, features, means, or instructions for receiving a second DCI having a second DCI format, the second DCI comprising a different downlink assignment indicator size than the first DCI format, determining, based on the second DCI, that a first feedback message for the first DCI may be multiplexed with a second feedback message for the second DCI, determining, based on the second DCI format for the second DCI, that the scheduling constraint is not satisfied, and determining, based on the second DCI not satisfying the scheduling constraint, that a scheduling error may have occurred.

Some examples of the method, apparatuses, and non-transitory computer-readable medium described herein may further include operations, features, means, or instructions for receiving a second DCI having the first DCI format, determining, based on the first DCI format for the second DCI, that the second DCI satisfies the scheduling constraint, and transmitting the feedback message for the first DCI and the second DCI based on the scheduling constraint being satisfied.

Some examples of the method, apparatuses, and non-transitory computer-readable medium described herein may further include operations, features, means, or instructions for receiving a second DCI having a second DCI format, where a size configuration for a DAI in the first DCI format may be associated with either a zero-bit or a one-bit downlink assignment counter and the size configuration for the DAI in the second DCI format may be associated with a two-bit downlink assignment counter, determining that the feedback message for the first DCI is to be multiplexed with a second feedback message for the second DCI, determining that the second DCI having the second DCI format may be received after the first DCI having the first DCI format, and determining, based on the first DCI format of the first DCI being received before the second DCI format of the second DCI, that the second DCI satisfies the scheduling constraint.

Some examples of the method, apparatuses, and non-transitory computer-readable medium described herein may further include operations, features, means, or instructions for incrementing a total DAI value associated with the first DCI and the second DCI based on a first counter DAI indicated in the first DCI and a second counter DAI indicated in the second DCI.

In some examples of the method, apparatuses, and non-transitory computer-readable medium described herein, the first downlink control information format is used to schedule a physical downlink shared channel (PDSCH) reception, or indicate a semi-persistent resource PDSCH release, or indicate secondary cell (SCell) dormancy without scheduling a PDSCH reception.

A method of wireless communication at a base station is described. The method may include transmitting a configuration signal identifying a scheduling constraint for a UE, the scheduling constraint for downlink feedback messages associated with a dynamic codebook configuration and scheduled using a first DCI format, transmitting a first DCI having the first DCI format, and receiving a feedback message for the first DCI based on the scheduling constraint being satisfied.

An apparatus for wireless communication at a base station is described. The apparatus may include a processor, memory coupled with the processor, and instructions stored in the memory. The instructions may be executable by the processor to cause the apparatus to transmit a configuration signal identifying a scheduling constraint for a UE, the scheduling constraint for downlink feedback messages associated with a dynamic codebook configuration and scheduled using a first DCI format, transmit a first DCI having the first DCI format, and receive a feedback message for the first DCI based on the scheduling constraint being satisfied.

Another apparatus for wireless communication at a base station is described. The apparatus may include means for transmitting a configuration signal identifying a scheduling constraint for a UE, the scheduling constraint for downlink feedback messages associated with a dynamic codebook configuration and scheduled using a first DCI format, transmitting a first DCI having the first DCI format, and receiving a feedback message for the first DCI based on the scheduling constraint being satisfied.

A non-transitory computer-readable medium storing code for wireless communication at a base station is described. The code may include instructions executable by a processor to transmit a configuration signal identifying a scheduling constraint for a UE, the scheduling constraint for downlink feedback messages associated with a dynamic codebook configuration and scheduled using a first DCI format, transmit a first DCI having the first DCI format, and receive a feedback message for the first DCI based on the scheduling constraint being satisfied.

Some examples of the method, apparatuses, and non-transitory computer-readable medium described herein may further include operations, features, means, or instructions for refraining from transmitting a second DCI having a second DCI format based on the scheduling constraint.

In some examples of the method, apparatuses, and non-transitory computer-readable medium described herein, the first downlink control information format is used to schedule a PDSCH reception, or indicate a semi-persistent resource PDSCH release, or indicate SCel) dormancy without scheduling a PDSCH reception A method of wireless communication at a UE is described. The method may include receiving a set of one or more first DCI scheduling corresponding first downlink transmissions, each of the one or more first DCI having a unique first downlink assignment counter, receiving a set of one or more second DCI scheduling corresponding second downlink transmissions, each of the one or more second DCI having a unique second downlink assignment counter, generating a concatenated codebook for a feedback message based on the first downlink assignment counter in each of the one or more first DCI and the second downlink assignment counter in each of the one or more second DCI, and transmitting the feedback message for the first downlink transmissions and the second downlink transmissions indicating the concatenated codebook.

An apparatus for wireless communication at a UE is described. The apparatus may include a processor, memory coupled with the processor, and instructions stored in the memory. The instructions may be executable by the processor to cause the apparatus to receive a set of one or more first DCI scheduling corresponding first downlink transmissions, each of the one or more first DCI having a unique first downlink assignment counter, receive a set of one or more second DCI scheduling corresponding second downlink transmissions, each of the one or more second DCI having a unique second downlink assignment counter, generate a concatenated codebook for a feedback message based on the first downlink assignment counter in each of the one or more first DCI and the second downlink assignment counter in each of the one or more second DCI, and transmit the feedback message for the first downlink transmissions and the second downlink transmissions indicating the concatenated codebook.

Another apparatus for wireless communication at a UE is described. The apparatus may include means for receiving a set of one or more first DCI scheduling corresponding first downlink transmissions, each of the one or more first DCI having a unique first downlink assignment counter, receiving a set of one or more second DCI scheduling corresponding second downlink transmissions, each of the one or more second DCI having a unique second downlink assignment counter, generating a concatenated codebook for a feedback message based on the first downlink assignment counter in each of the one or more first DCI and the second downlink assignment counter in each of the one or more second DCI, and transmitting the feedback message for the first downlink transmissions and the second downlink transmissions indicating the concatenated codebook.

A non-transitory computer-readable medium storing code for wireless communication at a UE is described. The code may include instructions executable by a processor to receive a set of one or more first DCI scheduling corresponding first downlink transmissions, each of the one or more first DCI having a unique first downlink assignment counter, receive a set of one or more second DCI scheduling corresponding second downlink transmissions, each of the one or more second DCI having a unique second downlink assignment counter, generate a concatenated codebook for a feedback message based on the first downlink assignment counter in each of the one or more first DCI and the second downlink assignment counter in each of the one or more second DCI, and transmit the feedback message for the first downlink transmissions and the second downlink transmissions indicating the concatenated codebook.

Some examples of the method, apparatuses, and non-transitory computer-readable medium described herein may further include operations, features, means, or instructions for incrementing, for each first DCI, a first total DAI value associated with the first downlink transmissions, and incrementing, for each second DCI, a second total DAI value associated with the second downlink transmissions, where the concatenated codebook may be based on the first total DAI value and the second total DAI value.

Some examples of the method, apparatuses, and non-transitory computer-readable medium described herein may further include operations, features, means, or instructions for incrementing, for each first DCI, a first counter DAI value associated with the first downlink transmissions, and incrementing, for each second DCI, a second counter DAI value associated with the second downlink transmissions, where the concatenated codebook may be based on the first counter DAI value and the second counter DAI value.

A method of wireless communication at a UE is described. The method may include generating a codebook based on receiving one or more DCI during corresponding control channel monitoring occasions configured for the UE, each received DCI including a first DCI format, identifying a negative-acknowledgement bit that is located between two HARQ-ACK bits in the codebook, determining that a DCI having a second DCI format was received during a control channel monitoring occasion corresponding to the negative-acknowledgement bit and between control channel monitoring occasions corresponding to the two HARQ-ACK bits, updating the codebook based on the determining, and transmitting a feedback message indicating the codebook.

An apparatus for wireless communication at a UE is described. The apparatus may include a processor, memory coupled with the processor, and instructions stored in the memory. The instructions may be executable by the processor to cause the apparatus to generate a codebook based on receiving one or more DCI during corresponding control channel monitoring occasions configured for the UE, each received DCI including a first DCI format, identify a negative-acknowledgement bit that is located between two HARQ-ACK bits in the codebook, determine that a DCI having a second DCI format was received during a control channel monitoring occasion corresponding to the negative-acknowledgement bit and between control channel monitoring occasions corresponding to the two HARQ-ACK bits, update the codebook based on the determining, and transmit a feedback message indicating the codebook.

Another apparatus for wireless communication at a UE is described. The apparatus may include means for generating a codebook based on receiving one or more DCI during corresponding control channel monitoring occasions configured for the UE, each received DCI including a first DCI format, identifying a negative-acknowledgement bit that is located between two HARQ-ACK bits in the codebook, determining that a DCI having a second DCI format was received during a control channel monitoring occasion corresponding to the negative-acknowledgement bit and between control channel monitoring occasions corresponding to the two HARQ-ACK bits, updating the codebook based on the determining, and transmitting a feedback message indicating the codebook.

A non-transitory computer-readable medium storing code for wireless communication at a UE is described. The code may include instructions executable by a processor to generate a codebook based on receiving one or more DCI during corresponding control channel monitoring occasions configured for the UE, each received DCI including a first DCI format, identify a negative-acknowledgement bit that is located between two HARQ-ACK bits in the codebook, determine that a DCI having a second DCI format was received during a control channel monitoring occasion corresponding to the negative-acknowledgement bit and between control channel monitoring occasions corresponding to the two HARQ-ACK bits, update the codebook based on the determining, and transmit a feedback message indicating the codebook.

In some examples of the method, apparatuses, and non-transitory computer-readable medium described herein, updating the codebook may include operations, features, means, or instructions for replacing the negative-acknowledgement bit with a HARQ-ACK bit selected based on a decoding result of the second DCI having the second DCI format.

Some examples of the method, apparatuses, and non-transitory computer-readable medium described herein may further include operations, features, means, or instructions for determining that a number of consecutive negative-acknowledgement bits located between HARQ-ACK bits may be not equal to a number of HARQ-ACK bits corresponding to the second DCI, and maintaining the two negative-acknowledgement bits in the codebook based on the determining.

Some examples of the method, apparatuses, and non-transitory computer-readable medium described herein may further include operations, features, means, or instructions for determining that one or more DCI having the second DCI format were received during control channel monitoring occasions occurring after a control channel monitoring occasion corresponding to a last bit in the codebook, and appending the codebook with one or more bits, each bit corresponding to the at least one of the one or more DCI.

A method of wireless communication at a UE is described. The method may include receiving one or more first DCI, each first DCI including a first DCI format and a first DAI value based on a first modulo operator, receiving one or more second DCI, each second DCI including a second DCI format and a second DAI value based on a second modulo operator, performing, for each received of the first DCI, a conversion operation on the first DAI value to change the modulo operator from the first modulo operator to the second modulo operator, generating a codebook based on the conversion operation, and transmitting a feedback message indicating the codebook.

An apparatus for wireless communication at a UE is described. The apparatus may include a processor, memory coupled with the processor, and instructions stored in the memory. The instructions may be executable by the processor to cause the apparatus to receive one or more first DCI, each first DCI including a first DCI format and a first DAI value based on a first modulo operator, receive one or more second DCI, each second DCI including a second DCI format and a second DAI value based on a second modulo operator, perform, for each received of the first DCI, a conversion operation on the first DAI value to change the modulo operator from the first modulo operator to the second modulo operator, generate a codebook based on the conversion operation, and transmit a feedback message indicating the codebook.

Another apparatus for wireless communication at a UE is described. The apparatus may include means for receiving one or more first DCI, each first DCI including a first DCI format and a first DAI value based on a first modulo operator, receiving one or more second DCI, each second DCI including a second DCI format and a second DAI value based on a second modulo operator, performing, for each received of the first DCI, a conversion operation on the first DAI value to change the modulo operator from the first modulo operator to the second modulo operator, generating a codebook based on the conversion operation, and transmitting a feedback message indicating the codebook.

A non-transitory computer-readable medium storing code for wireless communication at a UE is described. The code may include instructions executable by a processor to receive one or more first DCI, each first DCI including a first DCI format and a first DAI value based on a first modulo operator, receive one or more second DCI, each second DCI including a second DCI format and a second DAI value based on a second modulo operator, perform, for each received of the first DCI, a conversion operation on the first DAI value to change the modulo operator from the first modulo operator to the second modulo operator, generate a codebook based on the conversion operation, and transmit a feedback message indicating the codebook.

In some examples of the method, apparatuses, and non-transitory computer-readable medium described herein, the conversion operation may be performed based on a size configuration for a counter DAI in the first DCI format including a two-bit downlink assignment counter and the size configuration for the counter DAI in the second DCI format including a one-bit downlink assignment counter.

In some examples of the method, apparatuses, and non-transitory computer-readable medium described herein, the first modulo operator includes a modulo four and the second modulo operator includes a modulo two.

In some examples of the method, apparatuses, and non-transitory computer-readable medium described herein, the conversion operation may include operations, features, means, or instructions for converting the modulo four of the first modulo operator to a modulo two by applying a modulo two operation on a value indicated in the DAI of the first DCI format indicated using modulo four.

In some examples of the method, apparatuses, and non-transitory computer-readable medium described herein, the conversion operation may be performed based on receiving the one or more second DCI having the second DCI format.

DETAILED DESCRIPTION

Figure 1:
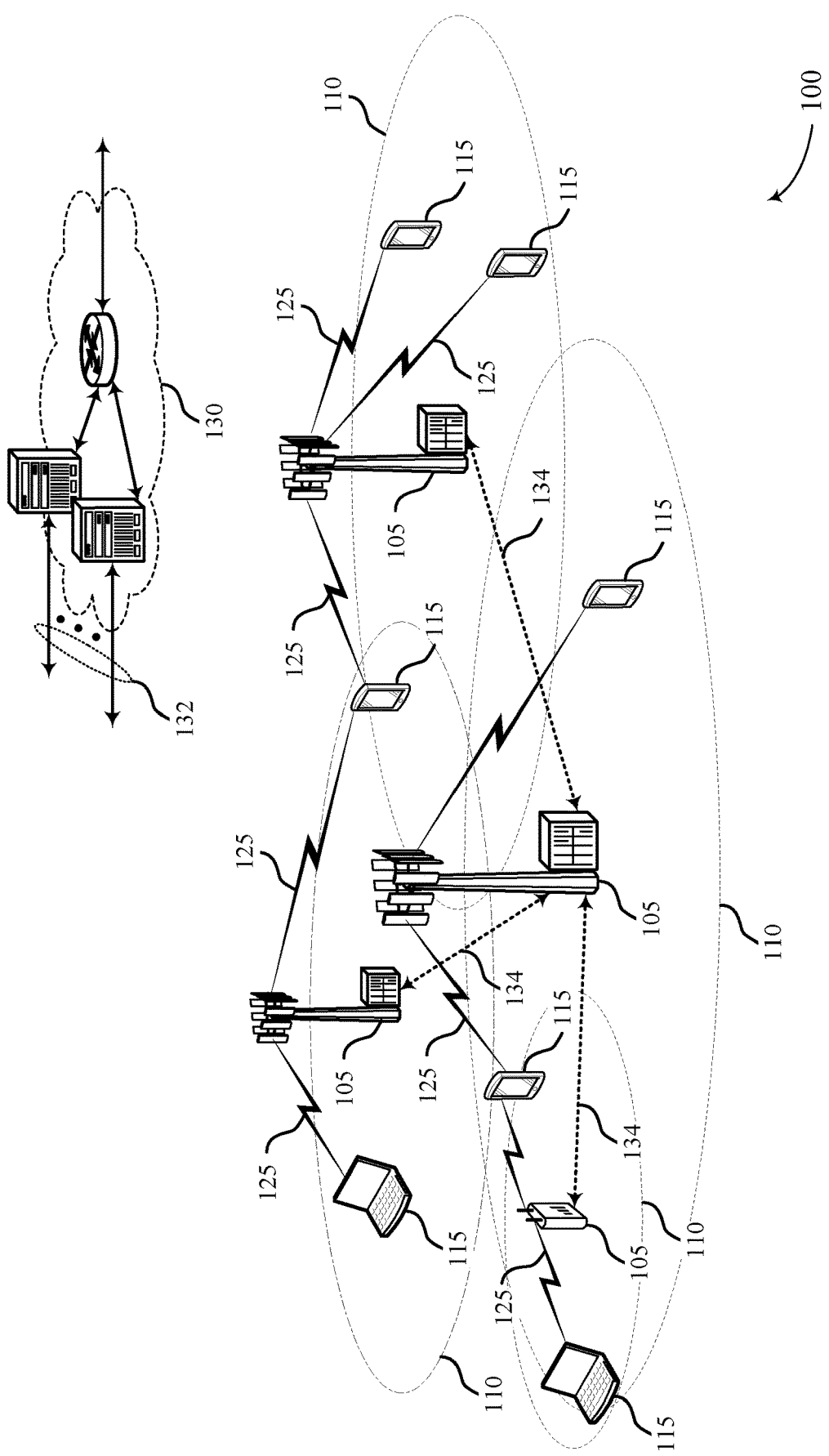
FIG. 1 illustrates an example of a system for wireless communications that supports hybrid automatic repeat/request-acknowledgement (HARQ-ACK) codebook determination with different downlink assignment indicator (DAI) bitwidth in accordance with aspects of the present disclosure.

Wireless communication systems typically schedule communications using a grant, e.g., a downlink control information (DCI) grant or simply DCI. For example, the base station transmits DCI grants to user equipment (UE) to schedule downlink transmissions, with each DCI grant identifying resources and other information to be used for the corresponding downlink transmission. Different DCI formats may be used to schedule such transmissions, with each DCI format being configured differently. Generally, the DCI may indicate whether or not feedback reporting is requested for the downlink transmission. For example, the DCI may indicate that feedback reporting is requested, and also identify the parameters for the feedback report (or message). For example, the DCI may indicate whether the feedback message will utilize a type-II (e.g., dynamic) hybrid automatic repeat/request-acknowledgment (HARQ-ACK) codebook design or a type-I HARQ-ACK codebook design. Moreover, a downlink assignment indicator (DAI) field in the DCI may indicate a numerical sequence (e.g., a counting sequence for downlink transmissions associated with the same HARQ reporting occasion) for the downlink transmission to be reported in the feedback message. However, some DCI formats have different size DAI fields than other DCI formats (e.g., 0 bits, 1 bit, 2 bits, etc.). For a UE attempting to monitor the count for downlink transmissions reported in the feedback message, this may create problems when the DCIs scheduling the downlink transmissions have different size DAIs (e.g., different number of bits).

Aspects of the disclosure are initially described in the context of a wireless communications system. Broadly, aspects of the described various techniques support HARQ-ACK codebook design in the situation where the size (e.g., the number of bits) of the DAI conveyed in DCI grants vary. In particular, the described techniques provide multiple solutions that avoid such mismatch and/or provide techniques for a UE and/or base station to implement when the mismatch occurs.

One example solution is a scheduling constraint-based solution. In particular, the base station may configure the UE with the scheduling constraint by transmitting a configuration signal to the UE (e.g., a radio resource control (RRC) signal). Broadly, the scheduling constraint may be for downlink transmissions scheduled with a dynamic codebook configuration (e.g., a HARQ type-2 codebook) which are scheduled using a first DCI format, e.g., DCI format 1_2. The base station may transmit a first DCI to the UE scheduling a first downlink transmission using the first DCI format. The UE may determine that, since the first DCI uses the first DCI format and/or that the downlink transmission uses the type-2 HARQ codebook, that the first downlink transmission satisfies the scheduling constraint. Accordingly, the UE may monitor for the first downlink transmission from the base station and transmit a feedback message for the first downlink transmission based on the monitoring. When the first downlink transmission scheduled by the first DCI corresponds to a semi-persistent resource release, the UE and/or base station may release the semi-persistent resources according to the first DCI.

Another example solution may include the UE concatenating two separate codebooks to derive a joint codebook for transmission. For example, the UE may receive first DCI grant(s) scheduling corresponding first downlink transmission(s), with each first DCI grant having a unique DAI counter. The UE may also receive second DCI grant(s) scheduling corresponding second downlink transmission(s), with each of the second DCI grants having a unique DAI counter. The UE may generate a concatenated codebook for a feedback message based on the DAI counters in each of the first DCIs and the DAI counters in each of the second DCIs. Accordingly, the UE may transmit the feedback message for the first and second downlink transmissions that carries or otherwise conveys the indication of the concatenated codebook.

Another example solution may include the UE utilizing one codebook in a joint feedback message. For example, the UE may generate a codebook for DCI(s) received during control channel monitoring occasions configured for the UE. The UE may generate the codebook based on the DCIs having the first DCI format (e.g., DCI formats 1_1/1_0. The UE may determine or otherwise detect negative-acknowledgment (NACK) bit(s) in the codebook that is situated between two HARQ-ACK bits. The UE may determine that a DCI having a second DCI format (e.g., DCI format 1_2) was received during a control channel monitoring occasion corresponding to the NACK bit (e.g., between control channel monitoring occasions corresponding to the two HARQ-ACK bits). The UE may update the codebook based on this determination and then transmit a feedback message to the base station indicating the updated codebook. For example, the UE may replace, in some examples, the NACK bit with a HARQ-ACK bit (e.g., based on the decoding result of the second DCI).

In another example solution, the UE may receive first DCI(s), with each first DCI having the first DCI format (e.g., DCI formats 1_1/1_0) and a first DAI value based on a first modulo operator (e.g., modulo four). The UE may also receive second DCI(s), with each second DCI having a second DCI format (e.g., DCI format 1_2) and a second DAI value based on a second modulo operator (e.g., modulo two). For each of the received first DCI(s), the UE may perform a conversion operation on the corresponding first DAI value to change the modulo operator from the first modulo operator to a second modulo operator (e.g., from modulo four to modulo two). Accordingly, the UE may generate a codebook based on the conversion operation (e.g., using the modulo two) and transmit a feedback message to the base station indicating the codebook.

Aspects of the disclosure are further illustrated by and described with reference to apparatus diagrams, system diagrams, and flowcharts that relate to hybrid automatic repeat/request-acknowledgement codebook determination with different downlink assignment indicator bitwidth.

FIG. 1 illustrates an example of a wireless communications system 100 that supports HARQ-ACK codebook determination with different DAI bitwidth in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internetof-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive a configuration signal identifying a scheduling constraint for the UE 115, the scheduling constraint for downlink feedback messages associated with a dynamic codebook configuration and scheduled using a first DCI format. The UE 115 may receive a first DCI having the first DCI format. The UE 115 may determine, based at least in part on the first DCI format, that the scheduling constraint is satisfied. The UE 115 may transmit a feedback message for the first DCI based at least in part on the scheduling constraint being satisfied.

A base station 105 may transmit a configuration signal identifying a scheduling constraint for a UE 115, the scheduling constraint for downlink feedback messages associated with a dynamic codebook configuration and scheduled using a first DCI format. The base station 105 may transmit a first DCI having the first DCI format. The base station 105 may receive a feedback message for the first DCI based at least in part on the scheduling constraint being satisfied.

A UE 115 may receive a set of one or more first DCI scheduling corresponding first downlink transmissions, each of the one or more first DCI having a unique first downlink assignment counter. The UE 115 may receive a set of one or more second DCI scheduling corresponding second downlink transmissions, each of the one or more second DCI having a unique second downlink assignment counter. The UE 115 may generate a concatenated codebook for a feedback message based at least in part on the first downlink assignment counter in each of the one or more first DCI and the second downlink assignment counter in each of the one or more second DCI. The UE 115 may transmit the feedback message for the first downlink transmissions and the second downlink transmissions indicating the concatenated codebook.

A UE 115 may generate a codebook based at least in part on receiving one or more DCI during corresponding control channel monitoring occasions configured for the UE 115, each received DCI comprising a first DCI format. The UE 115 may identify a NACK bit that is located between two HARQ-ACK bits in the codebook. The UE 115 may determine that a DCI having a second DCI format was received during a control channel monitoring occasion corresponding to the NACK bit and between control channel monitoring occasions corresponding to the two HARQ-ACK bits. The UE 115 may update the codebook based at least in part on the determining. The UE 115 may transmit a feedback message indicating the codebook.

A UE 115 may receive one or more first DCI, each first DCI comprising a first DCI format and a first downlink assignment indicator value based on a first modulo operator. The UE 115 may receive one or more second DCI, each second DCI comprising a second DCI format and a second downlink assignment indicator value based on a second modulo operator. The UE 115 may perform, for each received of the first DCI, a conversion operation on the first downlink assignment indicator value to change the modulo operator from the first modulo operator to the second modulo operator. The UE 115 may generate a codebook based at least in part on the conversion operation. The UE 115 may transmit a feedback message indicating the codebook.

Figure 2:
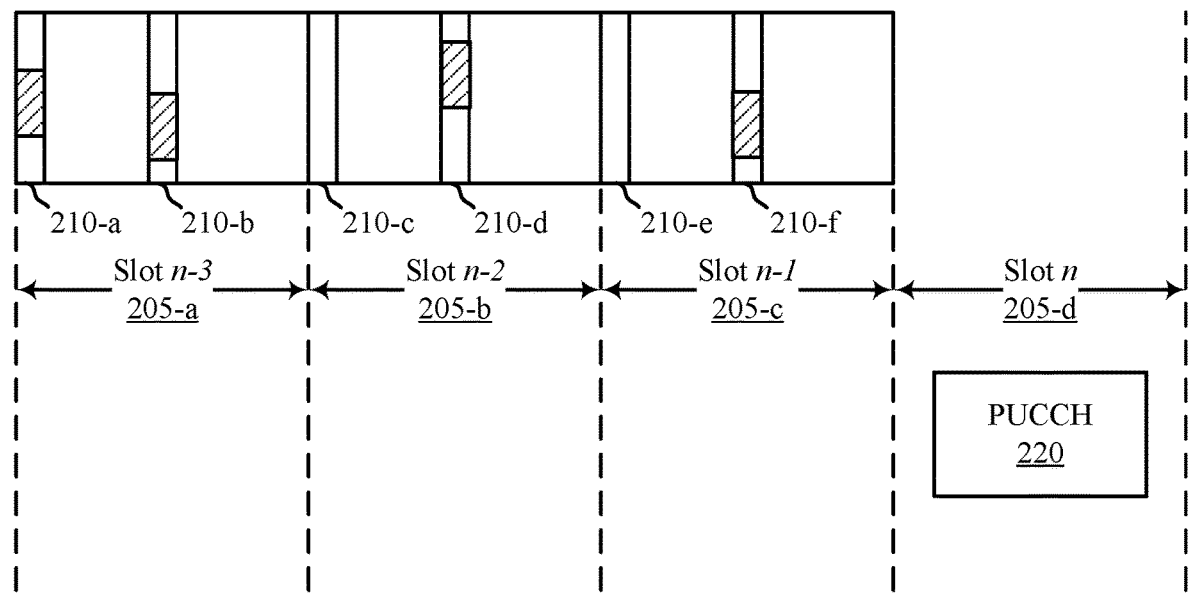
FIG. 2 illustrates an example of a reporting configuration that supports HARQ-ACK codebook determination with different DAI bitwidth in accordance with aspects of the present disclosure.
Figure 2:
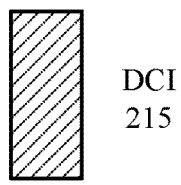

FIG. 2 illustrates an example of a reporting configuration 200 that supports HARQ-ACK codebook determination with different DAI bitwidth in accordance with aspects of the present disclosure. In some examples, reporting configuration 200 may implement aspects of wireless communication system 100. Aspects of reporting configuration 200 may be implemented by a base station and/or UE, which may be examples of the corresponding devices described herein.

Broadly, reporting configuration 200 illustrates a non-limiting example of how HARQ feedback reporting may be implemented in a wireless communication system. Wireless communications may be performed utilizing grants, such as DCI grants or simply DCI. For example, the UE may be configured with monitoring occasions 210 for a control channel (e.g., PDCCH) during slots 205 in which to monitor for a grant, such as DCI 215. The UE may receive DCI 215 grants during the monitoring occasions 210-a and 210-b of slot 205-a, during the monitoring occasion 210-d of slot 205-b, and during monitoring occasion 210-f of slot 205-c. Each monitoring occasion 210 may generally define a search space configuration identifying particular time and/or frequency resources within the slot 205 that the UE is to search for DCI 215 grants. The DCI 215 grants received by the UE may each schedule corresponding downlink transmissions, which are received in the same slot 205 or in a later slot 205. In the example illustrated in reporting configuration 200, the UE is configured to provide a feedback message in PUCCH 220 during slot 205-d for the downlink transmissions scheduled by the DCI 215 grants received during slots 205-a, 205-b, and 205-c.

In some aspects, DCI 215 may configured, or otherwise have, one of a plurality of available DCI formats. Examples of available DCI formats include, but are not limited to, a DCI format 0_1, DCI format 1_1, DCI format 0_2, DCI format 1_2, and the like. Generally, the first number in the DCI format indicates whether the grant is for a downlink transmission for an uplink transmission, e.g., DCI format 0_2 is for an uplink transmission and DCI format 1_2 is for a downlink transmission. DCI formats 0_2 and 1_2 may be considered compact DCI formats in that they have a smaller size (e.g., fewer bits, carry less information, etc.) than other DCI formats.

In some wireless communication systems, for HARQ-ACK feedback reporting using a type-II codebook (e.g., a dynamic codebook), the HARQ-ACK codebook is determined based on the DAI indicated in the downlink grant (e.g., in DCI formats 1_0 and 1_1). For HARQ-ACK feedback using a type-II (type-2) codebook, DCI formats 1_0, 1_1 and 1_2 may schedule PDSCH transmissions (e.g., downlink transmissions) with HARQ-ACK feedback belonging to the same codebook. However, the size (e.g., the number of bits) of the (counter) DAI field in DCI format 1_2 may be different than the size of the DAI field in DCI formats 1_0 and 1_1. This may raise an issue with respect to generating the HARQ-ACK codebook with mismatched DAI sizes.

Broadly, the DAI may serve as a downlink assignment index and is contained in, at least for downlink transmissions, DCI formats 1_0, 1_1, and 1_2. At least two terms may be used in conjunction with references to the DAI. A counter DAI may refer to an accumulative number of {serving cell, a PDCCH monitoring occasion} pairs in which PDSCH reception/semi-persistent scheduling (SPS) release associated with a DCI 215 transmitted by a base station, up to the current serving cell and current PDCCH monitoring occasion. This may be listed as serving cell first, and then PDCCH monitoring occasion second. This may use two bits (e.g., the size configuration or number of bits) in DCI formats 1_0 and 1_1. The counter DAI for DCI format 1_2 may be 0, 1, or 2 bits, with a condition that 1 bit is allowed when a single downlink serving cell is configured. The bitwidth (e.g., size) for the counter DAI in DCI format 1_2 is typically configured by RRC signaling.

Another term refers to the total DAI, which is the total number of {serving cell, PDCCH monitoring occasion} pairs in which PDSCH reception/SPS release associated with the DCI 215 sent by the base station, up to the current PDCCH monitoring occasion. This may be updated from PDCCH monitoring occasion to PDCCH monitoring occasion (e.g., between monitoring occasions 210). The UE may assume the same total DAI value in all DCI format 1_1 in the same PDCCH monitoring occasion. This may use 0 bits in DCI format 1_0, and 2 bits in DCI format 1_1 and 1_2 if CA is configured.

Typically, the UE uses the DAI to determine the codebook for the feedback message. That is, the codebook may refer to a sequence of bits included in the feedback message, with each bit associated with a particular PDSCH reception/SPS release/SCell dormancy and indicating whether or not the UE was able to successfully receive and decode the PDSCH reception, SPS release, and/or SCell dormancy without scheduling a corresponding PDSCH reception (which may be collectively referred to as a downlink transmission). For example and with reference to reporting configuration 200, the DCI 215 received during monitoring occasion 210-a may indicate a DAI value of 1, the DCI 215 received during the monitoring occasion 210-b may indicate a DAI value of 2, the DCI 215 received during monitoring occasion 210-d may indicate a DAI value of 3, and the DCI 215 received during monitoring occasion 210-f may indicate a DAI value of 4. Assuming the UE is able to successfully receive and decode the corresponding downlink transmission scheduled by each DCI, the UE would generated codebook having four bits, with each bit set to a value to acknowledge (ACK) the corresponding downlink transmission (e.g., a codebook of 1,1,1,1). If the UE was unable to receive or successfully decode DCI 215 received during monitoring occasion 210-d (for example), the UE would know that a DCI 215 having DAI value of 3 is missing, and would therefore insert a NACK bit into the codebook (e.g., codebook of 1,1,0,1). That is, the UE would know that for ACK/NACK bits that are scheduled by the base station and that the third downlink grant is missing, and therefore include the NACK bit in the codebook. As each DCI 215 and corresponding downlink transmission is associated with the same feedback reporting occasion (e.g., associated with the same HARQ process identifier), the UE would transmit the feedback message during PUCCH 220 to indicate the codebook.

In some aspects, wireless communication system may support the counter DAI (cDAI) being indicated with 2 bits, e.g., the DAI counter in DCI 215 is interpreted as modulo 4. This raises the question of how to determine the actual value of the cDAI (e.g., removing the modulo operation). That is, a DAI size using two bits can only have values of 00, 01, 10, and 11, i.e., modulo four. However, there may be more than four downlink transmissions scheduled for the same HARQ process, which may mean that the UE must determine the actual values of the cDAI.

One approach to solve this is to utilize a parameter j that keeps track of [cDAI/4], e.g., the actual cDAI=j*4+$V_{C-DAI,c,m}^{DL}$. Broadly, this may include the UE determining a variable j that indicates how many rounds the counter for the counter DAI has traversed (e.g., rolled over) in the modulo 4 operation. The UE increments j for each {serving cell/PDCCH monitoring occasion} pair if the current $V_{C-DAI,c,m}^{DL}$ is smaller than the previous $V_{C-DAI,c,m}^{DL}$. In the situation where the DAI size is one bit in DCI format 12, and when all HARQ-ACKs are scheduled by DCI formats 1_2, then the UE could simply change modulo 4 to modulo 2 to generate the HARQ codebook for the feedback message. However, when HARQ-ACKs are scheduled by different DCI formats with different DAI sizes, the methods discussed above may not work.

Accordingly, aspects of the described techniques provide various mechanisms (e.g., solutions) that when adopted may, alone or in any combination, address the issue of HARQ-ACKs scheduled by different DCI formats with different DAI sizes. A first solution provides a scheduling constraint approach where the UE is only scheduled with certain DCI formats when dynamic codebook generation (e.g., HARQ type-II codebook) is configured for the UE. For example, the base station may transmit a configuration signal (e.g., an RRC signal) to the UE identifying or otherwise defining the scheduling constraint. In another example, the scheduling constraint may be known beforehand (e.g., adopted in the relevant standards) such that both the base station and UE both know the scheduling constraint, thereby avoiding transmission of the configuration signal. The UE may then receive a first DCI 215 having a first DCI format (e.g., DCI format 1_2) and scheduling a first downlink transmission. The UE may determine that the first downlink transmission satisfies a scheduling constraint based on the first DCI format and/or the dynamic codebook configured for the first downlink transmission. Accordingly the UE may monitor for the first downlink transmission and transmit a feedback message to the base station for the first downlink transmission. Different proposals for the first solution may be adopted. When the first DCI indicates a SPS release, the downlink transmission, in this context, may correspond to the UE and/or base station releasing of the semi-persistent resources associated with the SPS configuration.

In one proposal, the scheduling constraint may be that when the cDAI in DCI format 1_2 is configured as a zero-bit DAI counter and the HARQ-ACK codebook type is type-II (e.g., dynamic), the UE does not expect to be scheduled with more than one bit HARQ-ACK corresponding to dynamic PDSCH or SPS release (e.g., downlink transmission) in a HARQ-ACK codebook scheduled by DCI format 1_2. In some aspects, the UE may not expect to be scheduled with a first HARQ-ACK feedback by a DCI format 1_2 and a second HARQ-ACK feedback (e.g., by any DCI format, including DCI format 1_2), where the first and second HARQ-QACK feedback belong to the same HARQ-ACK codebook (e.g., the same feedback message transmission). In some aspects, it may be an error case as long as the UE is scheduled to multiplex a HARQ-ACK scheduled by DCI format 1_2 with another HARQ-ACK scheduled by any DCI format. In some aspects, the UE may generate HARQ-ACK for a PDSCH reception and the PDCCH reception corresponding to SPS release. In some aspects, this may not prevent other DCI formats (e.g., DCI formats 1_0, 1_1, etc.) being used to schedule HARQ-ACK multiplexing. Accordingly, the UE may identify or otherwise determine that the size configuration (e.g., the bitwidth or number of bits) for the cDAI in the first DCI format is a zero-bit downlink assignment counter.

In an error case (e.g., when the scheduling constraint is violated), the UE may receive a second DCI using the first DCI format and scheduling a second downlink transmission. The UE may determine that, based on the second DCI, that a first feedback message for the first downlink transmission is to be multiplexed with a second feedback message for the second downlink transmission. Based on the first DCI format, the UE may determine that the second downlink transmission does not satisfy the scheduling constraint. Accordingly, the UE may determine that a scheduling error has occurred.

In another error case (e.g., when the scheduling constraint is violated), the UE may receive a second DCI having any other DCI format and scheduling a second downlink transmission. The UE may determine that the UE is scheduled to multiplex a HARQ-ACK scheduled by the first DCI having the DCI format with the HARQ-ACK scheduled by the second DCI. Based on the scheduled multiplexing, the UE may determine that a scheduling error has occurred. More particularly, the UE may receive the second DCI (e.g., regardless of which DCI format the second DCI uses). The UE may determine that, based on the second DCI, that a first feedback message for the first downlink transmission is to be multiplexed with a second feedback message for the second downlink transmission. Based on the first DCI format, the UE may determine that the second downlink transmission does not satisfy the scheduling constraint. Accordingly, the UE may determine that a scheduling error has occurred.

In a non-error case (e.g., when the scheduling constraint is followed), the UE may receive a second DCI having a second DCI format and scheduling the second downlink transmission. The UE may determine that the second downlink transmission satisfies a scheduling constraint based at least in part on the second DCI format. Accordingly, the UE may monitor for the second downlink transmission and transmit the feedback message for the first downlink transmission and the second downlink transmission based on the monitoring and since the second downlink transmission satisfies the scheduling constraint.

In a second proposal to the first solution, the scheduling constraint may be that when cDAI in DCI format 1_2 is configured to be 1 bit (e.g., one-bit downlink assignment counter) and the HARQ-ACK codebook is type-II, the UE does not expect to be scheduled with a first PDSCH or SPS release via DCI format 12 and a second PDSCH or SPS release via DCI format 1_0 or 11, wherein the HARQ-ACK corresponding to the first PDSCH or SPS release and the second PDSCH or SPS release are reported in the same PUCCH/PUSCH transmission (e.g., feedback message). That is, the UE may be scheduled with multiple DCIs using DCI format 1_2. In some aspects, HARQ-ACKs scheduled by DCI format 1_2 may be reported in the same PUCCH/PUSCH transmission and HARQ-ACKs scheduled by DCI formats 1_0 or 1_1 may be reported in the same PUCCH/PUSCH transmission. Accordingly, the UE may identify or otherwise determine that the size configuration (e.g., the bitwidth or number of bits) for the cDAI in the first DCI format is a one-bit downlink assignment counter.

In an error case (e.g., when the scheduling constraint is violated), the UE may receive a second DCI using a second DCI format and scheduling a second downlink transmission. The UE may determine that a first feedback message for the first downlink transmission is to be multiplexed with a second feedback message for the second downlink transmission. Accordingly, UE may determine that the second downlink transmission does not satisfy the scheduling constraint and, therefore, determine that a scheduling error has occurred.

In a non-error case (e.g., when the scheduling constraint is followed), the UE may receive the second DCI using the first DCI format scheduling the second downlink transmission. The UE may determine, based on the first DCI format for the second DCI, that the second downlink transmission satisfies the scheduling constraint. Accordingly, the UE may monitor for the second downlink transmission and transmit feedback messages for the first downlink transmission and the second downlink transmission to the base station.

A third proposal for the first solution may be relaxed version of the first and second proposals discussed above. That is, the third proposal allows HARQ-ACK corresponding to DCI format 1_2 to be multiplexed with HARQ-ACK corresponding to DCI formats 1_0/1_1 in the same PUCCH/PUSCH only if the DCI format 1_2 is received prior to receiving the DCI formats 1_0 and/or 1_1. In addition and when a zero-bit configuration is configured in DCI format 1_2, one HARQ-ACK bit corresponding to DCI format 1_2 can be scheduled, and is placed at the beginning of the codebook. If 1 bit is configured in DCI format 12, more than one HARQ-ACK bit can be scheduled by DCI format 1_2 and multiplexed with HARQ-ACKs corresponding to DCI format 1_1/1_0. Again, the bits corresponding to DCI format 1_2 may be placed in front of HARQ-ACK bits corresponding to DCI format 1_1/1_0 in the codebook. Finally, the cDAI in DCI formats 1_1/1_0 may be implemented on top of the cDAI (if any) in DCI format 1_2. That is, if cDAI in DCI format 1_2 and zero-bit is configured for DCI format 1_2, the first HARQ-ACK scheduled by DCI format 1_0/1_1 has a counter DAI=2, instead of 1. That is, the base station will set the DAI in the first DCI format 12 as DAI=1, set the DAI in second DCI format 1_0/1_1 as DAI=2, and so forth.

Accordingly, the UE may receive a second DCI having the second DCI format and scheduling the second downlink transmission. The second DCI may have the size configuration for a downlink assignment indicator, wherein the first DCI format is associated with either a zero-bit or a one-bit downlink assignment counter and the size configuration for the DAI in the second DCI format associated with a two-bit downlink assignment counter. Accordingly, the UE may determine, based on the first and second DCI formats, a second downlink transmission satisfies the scheduling constraint. Therefore, the UE may increment a total DAI value associated with the first downlink transmission and the second downlink transmission based on the first counter DAI indicated in the first DCI and a second counter DAI indicated in the second DCI.

Figure 3:
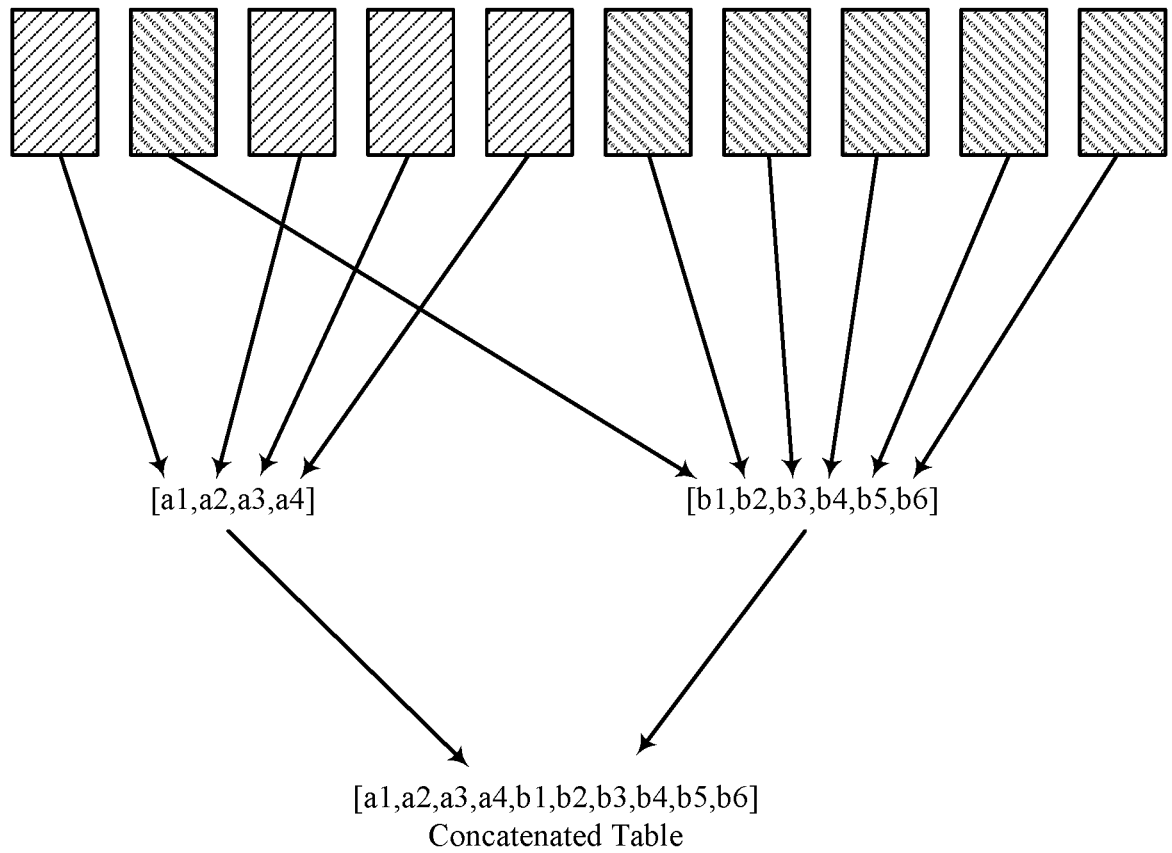
FIG. 3 illustrates an example of a codebook design that supports HARQ-ACK codebook determination with different DAI bitwidth in accordance with aspects of the present disclosure.
Figure 3:
Figure 3:

FIG. 3 illustrates an example of a codebook design 300 that supports HARQ-ACK codebook determination with different DAI bitwidth in accordance with aspects of the present disclosure. In some examples, codebook design 300 may implement aspects of wireless communication system 100 and/or reporting configuration 200. Aspects of codebook design 300 may be implemented by a base station and/or UE, which may be examples of the corresponding devices described herein.

Broadly, codebook design 300 illustrates a second solution for addressing a mismatch between DAI sizes and scheduling DCIs. The second solution generally includes concatenating two separate codebooks to generate a joint codebook to be communicated in a feedback message. For example, UE may receive a set of first DCIs 305 scheduling corresponding first downlink transmissions. Each of the first DCIs 305 may have a corresponding first DCI format (e.g., DCI format 1_2) and have a unique downlink assignment counter (e.g., cDAI value). The UE may also receive a set of one or more second DCIs 310 having a second DCI format (e.g., DCI format 1_1/1_0) and scheduling corresponding second downlink transmissions. Each of the second DCIs 310 may also have unique second downlink assignment counter (e.g., cDAI value). Accordingly, the UE may generate a concatenated codebook for a feedback message based on the downlink assignment counter in each of the first DCIs 305 and the downlink assignment counter in each of the second DCIs 310. UE may transmit the feedback message for the first downlink transmissions and the second downlink transmissions scheduled by the first DCIs 305 and second DCIs 310, respectively, to convey an indication of the concatenated codebook.

That is, the second solution allows the UE to multiplex HARQ-ACKs scheduled by DCI format 1_2 with the HARQ-ACK scheduled by DCI format 1_1/1_0 by generating separate codebooks for each DCI format, and then concatenating the codebooks. In this solution, the DAIs are separately counted/implemented for DCI format 1_2 and for DCI formats 1_1/1_0. For example, the UE may increment, for each first DCI 305, a first total and/or counter DAI value associated with the first downlink transmissions. The UE may also increment, for each second DCI 310, a second total DAI value associated with the second downlink transmissions. The concatenated codebook may be based on the first DAI value and the second DAI value.

More particularly, the UE may receive a set of first DCIs 305 (with four being shown by way of example only) and the second set of DCIs 310 (with six being shown by way of example only). For each first DCI 305, the UE may determine HARQ-ACK bits to generate a first codebook for the corresponding first downlink transmissions. For example, the HARQ-ACK bits in the first codebook may be a1, a2, a3, and a4 corresponding to the four first DCIs 305 received having the first DCI format 1_2. For each of the second DCIs 310, the UE may generate HARQ-ACK bits to generate a second codebook for the corresponding second downlink transmissions. For example, the HARQ-ACK bits in the second codebook may be b1, b2, b3, b4, b5, and b6 corresponding to the six second DCIs 310 received having the second DCI format 1_1/1_0. The UE may then concatenate the first codebook and the second codebook to generate a joint codebook to be reported in the feedback message. For example, the concatenated codebook may be a1, a2, a3, a4, b1, b2, b3, b4, b5, and b6, where each "a" bit corresponds to a separate first downlink transmission and each "b" bit corresponds to a separate second downlink transmission. It is to be understood that references to HARQ-ACK bits may simply refer to a bit being set to a particular value to indicate whether the UE was able to successfully receive and decode the corresponding DCI, and downlink transmission scheduled by the DCI. Accordingly, the UE may transmit the feedback message to the base station indicating the concatenated codebook developed according to the second solution.

Figure 4:
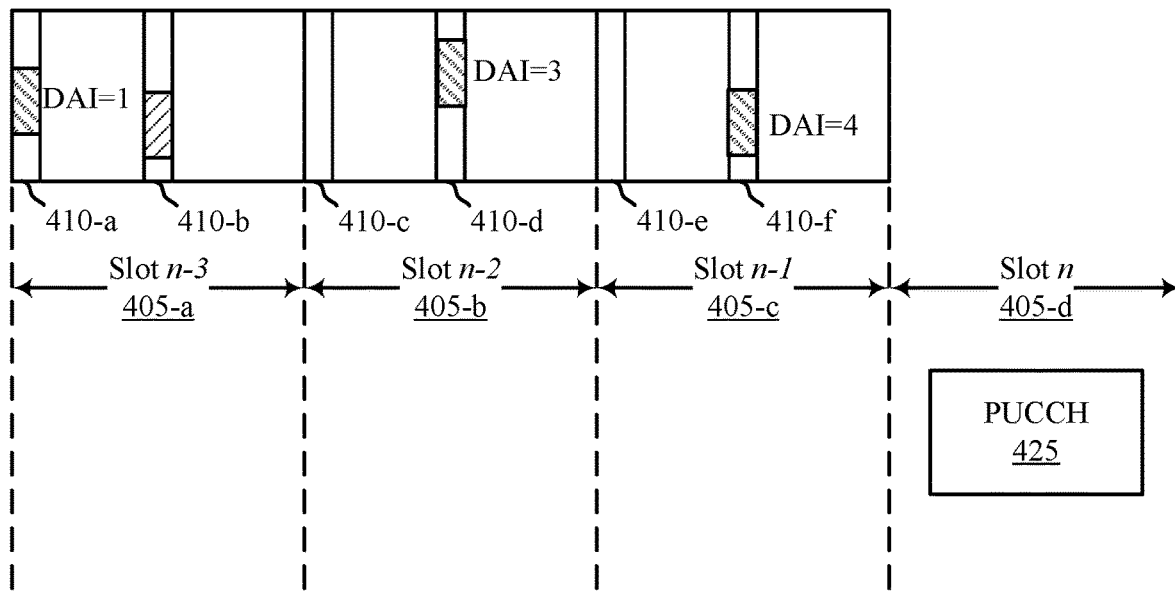
FIG. 4 illustrates an example of a reporting configuration that supports HARQ-ACK codebook determination with different DAI bitwidth in accordance with aspects of the present disclosure.

FIG. 4 illustrates an example of a reporting configuration 400 that supports HARQ-ACK codebook determination with different DAI bitwidth in accordance with aspects of the present disclosure. In some examples, reporting configuration 400 may implement aspects of wireless communication system 100, reporting configuration 200, and/or codebook design 300. Aspects of reporting configuration 400 may be implemented by a base station and/or UE, which may be examples of the corresponding devices described herein.

Broadly, reporting configuration 400 illustrates a non-limiting example of how HARQ feedback reporting may be implemented in a wireless communication system. As discussed, wireless communications may be performed utilizing grants, such as DCI grants or simply DCI. For example, the UE may be configured with monitoring occasions 410 for a control channel (e.g., PDCCH) during slots 405 in which to monitor for a grant, such as DCI 415 and/or DCI 420. For example, the UE may receive DCI 415/420 grants during the monitoring occasions 410-a and 410-b of slot 405-a, during the monitoring occasion 410-d of slot 405-b, and during monitoring occasion 410-f of slot 405-c. Each monitoring occasion 410 may generally include a search space configuration identifying particular time and/or frequency resources within the slot 405 that the UE is to search for DCI 415/420 grants.

The DCI 415/420 grants received by the UE may each schedule corresponding downlink transmissions which are received in the same slot 405 or in a later slot 405. In the example illustrated in reporting configuration 400, the UE is configured to provide a feedback message in PUCCH 425 during slot 405-d for the downlink transmissions scheduled by the DCI 415/420 grants. As also discussed, DCIs may configure, or otherwise have, one of a plurality of available DCI formats. For example, DCI(s) 415 may have a DCI format 1_2 and DCI(s) 420 may have a DCI format 1_1 or 1_0. Accordingly, the size configuration (e.g., number of bits) of the DAI indicated in each DCI may be different between DCI(s) 415 and DCI(s) 420.

Reporting configuration 400 illustrates an example of a third solution for addressing the situation where there is a mismatch between DAI sizes for DCIs scheduling downlink transmissions associated with a same HARQ process. Broadly, reporting configuration 400 illustrates a first example where a single codebook is used in a joint report (e.g., a feedback message). The example of the third solution illustrated in reporting configuration 400 is provided in the context of a single cell configured for the UE, and the cDAI size in the DCI 415 (e.g., DCI(s) using DCI format 1_2) being configured with a zero-bit.

Broadly, the third solution may include, for the same HARQ-ACK reporting slot/sub-slot, the UE may first determine a list of HARQ-ACK bits ordered according to the PDCCH monitoring occasions 410 over which the downlink grant (e.g., DCI grants) is received. The UE may denote this sequence as a_0, a_1, . . . , a_{N-1}, where N is a positive integer. Next, the UE may generate a codebook which contains the HARQ-ACK bits that are scheduled by DCI format 1_0 and 1_1, e.g., DCI(s) 420. The codebook may be determined using standard techniques, e.g., where if there are no adjacently received consecutive cDAI values (e.g., cyclically or sequentially), then the UE inserts NACK bits according to the corresponding cDAI values. The UE may denote this codebook as C1. The UE may denote the HARQ-ACK bits corresponding to DCI(s) 420 (e.g., DCI(s) using DCI format 1_1 and 1_0) as b_0, b_1, . . . , b_{M-1}, where M is a positive integer).

Next and for each pair of the consecutively generated HARQ-ACK bits corresponding to DCI(s) 420 in step two (denoted as b_k and b_{k-1}), the UE may have several options. If the UE determines that there are NACK bits inserted between the two HARQ-ACK bits in C1, and if the UE has generated HARQ-ACK bits corresponding to DCI 415 (e.g., DCI format 1_2) between b_k and b_{k-1} in step one, and the number of NACK bits inserted in step two equals the number of HARQ-ACK bits corresponding to DCI format 1_2 between b_k and b_{k-1} in step one, then the UE may replace the NACK bit in the HARQ-ACK codebook C1 with the actual HARQ-ACK bits corresponding to DCI 415 (e.g., DCI format 1_2). Next, if any NACK bit(s) are inserted in the beginning of the HARQ-ACK codebook C1 in step 2, and if the number of NACK bits is equal to the number of HARQ-ACK bits corresponding to DCI 415 that are generated before b0, then the UE may replace these NACK bit(s) with the actual HARQ-ACK bit(s) that the UE determined before b0. Finally, the UE may append all HARQ-ACK bits corresponding to DCI 415 that are generated after b_{M-1} to the end of codebook C1 to form the codebook C.

That is, the UE may generate a codebook based on receiving one or more DCIs (e.g., DCI(s) 420) during corresponding control channel monitoring occasions (e.g., monitoring occasions 410), with each DCI utilizing the first DCI format. The UE may determine or otherwise identify a NACK bit is located between two HARQ-ACK bits (e.g., b_k and b_{k-1}). Accordingly, the UE may determine that a DCI having the second DCI format (e.g., DCI 415 having DCI format 1_2) was received during a control channel monitoring occasion corresponding to the NACK bit (e.g., between a control channel monitoring occasions 410 corresponding to the two HARQ-ACK bits b_k and b_{k-1}). Accordingly, the UE may update the codebook based on this determination and transmit the feedback message to the base station indicating the codebook.

For example, the UE may replace the NACK bit with a HARQ-ACK bit selected based on the decoding result for the second DCI having the second DCI format (e.g., DCI 415 having DCI format 1_2). In some aspects, the UE may determine that a number of consecutive NACK bits located between the HARQ-ACK bits is not equal to the number of HARQ-ACK bits corresponding to the second DCI. In this context, the UE may maintain the two NACK bits in the codebook, e.g., not update the codebook since the UE may not know which NACK bit corresponds to a successfully decoded DCI 415 and corresponding downlink transmission.

More particularly and with reference to reporting configuration 400, the first step may include the UE determining a0, a1, a2, and a3, which correspond to reporting occasions 410-a, 410-b, 410-d, and 410-f, respectively, in which the UE received a DCI. The UE may determine that it received DCI 420 in monitoring occasions 410-a, 410-d, and 410-f (e.g., a0, a2, and a3). Accordingly, UE may determine that b0=a0, b1=a2, and b2=a3. Therefore, the UE may generate HARQ-ACK codebook C1 to be [b0,NACK,b1,b2] based on the DAI value, e.g., DAI value 1 indicated in DCI 420 received in monitoring occasions 410-a, DAI value 3 indicated in the DCI 420 received in monitoring occasion 410-d, and DAI value 4 indicated in the DCI 420 received in monitoring occasion 410-f. That is, in this configuration, the UE has not missed any DCI format. Accordingly, the proposed scheme allows the UE to generate an actual HARQ-ACK codebook where the HARQ-ACK bits in the codebook are ordered according to the corresponding PDCCH monitoring occasions (e.g., monitoring occasions 410).

Between b0 and b1, the UE may determine that there is a NACK inserted in codebook C1. In the HARQ-ACK list generated in step one, a one-bit a 1 may be generated between b0=a0 and b1=a2. In this case, the UE will replace the NACK bit with a1 and the final codebook is [a0,a1,a2,a3].

Figure 5:
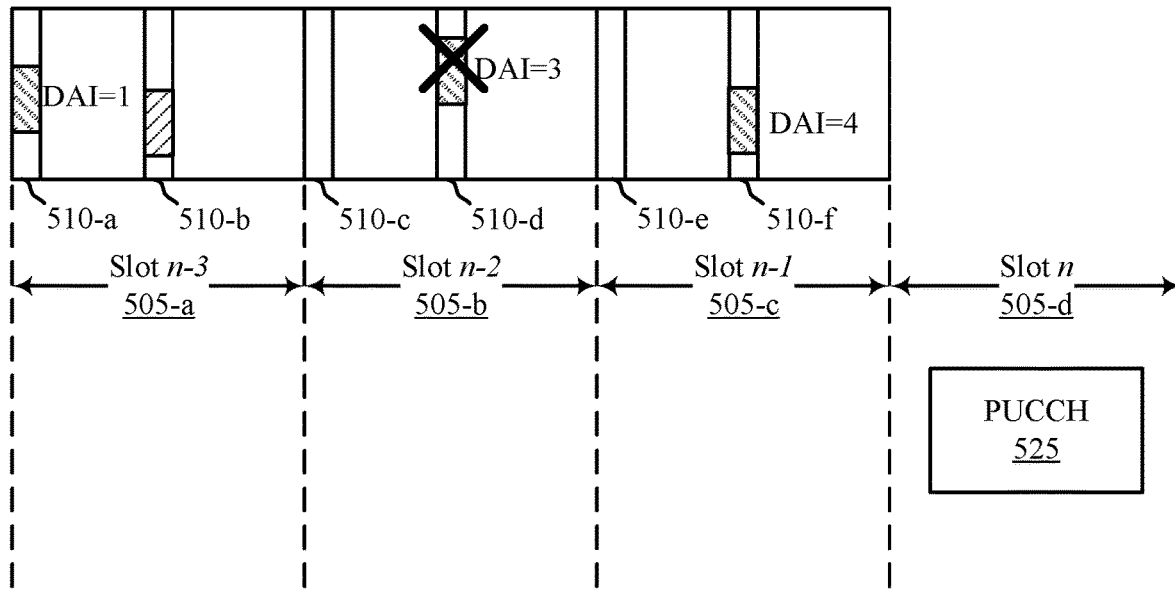
FIG. 5 illustrates an example of a reporting configuration that supports HARQ-ACK codebook determination with different DAI bitwidth in accordance with aspects of the present disclosure.

FIG. 5 illustrates an example of a reporting configuration 500 that supports HARQ-ACK codebook determination with different DAI bitwidth in accordance with aspects of the present disclosure. In some examples, reporting configuration 500 may implement aspects of wireless communication system 100, reporting configurations 200 and/or 400, and/or codebook design 300. Aspects of reporting configuration 500 may be implemented by a base station and/or UE, which may be examples of the corresponding devices described herein.

Broadly, reporting configuration 500 illustrates another non-limiting example of application of the third solution discussed with reference to reporting occasion 400. That is, the UE may generate a codebook based on receiving one or more DCIs (e.g., DCI(s) 520 associated with DCI formats 1_0/1_1) during corresponding control channel monitoring occasions (e.g., monitoring occasions 510), with each DCI utilizing the first DCI format (e.g., DCI formats 1_1/1_0). The UE may determine or otherwise identify a NACK bit is located between two HARQ-ACK bits (e.g., b_k and b_{k−1}). Accordingly, the UE may determine that a DCI having the second DCI format (e.g., DCI 515 having DCI format 1_2) was received during a control channel monitoring occasion corresponding to the NACK bit (e.g., between a control channel monitoring occasions 510 corresponding to the two HARQ-ACK bits b_k and b_{k−1}). Accordingly, the UE may update the codebook based on this determination and transmit the feedback message to the base station indicating the codebook. In some examples, the UE may determine that a number of consecutive NACK bits located between the HARQ-ACK bits is not equal to the number of HARQ-ACK bits corresponding to the second DCI. In this context, the UE may maintain the two NACK bits in the codebook.

In the example reporting configuration 500, the DCI corresponding to a2 is missing, as indicated by the X placed over that DCI (e.g., the UE did not successfully receive and decode the DCI in the monitoring occasion 510).

More particularly and with reference to reporting configuration 500, the first step may include the UE determining a0, a1, and a3, which corresponds to reporting occasions 510-a, 510-b, and 510-f in which the UE received a DCI 515. The UE may determine that it received DCI 520 in monitoring occasions 510-a and 510-f (e.g., a0 and a3). Accordingly, UE may determine that b0=a0 and b1=a3. Therefore, the UE may generate HARQ-ACK codebook C1 to be [b0,NACK,NACK,b2] based on the DAI value, e.g., DAI value 1 indicated in DCI 520 received in monitoring occasions 510-a and DAI value 4 indicated in the DCI 520 received in monitoring occasion 510-f.

Between b0 and b1, the UE may determine that there are two NACKs inserted in codebook C1. In the HARQ-ACK codebook generated in step one, a one-bit a1 may be generated between b0=a0 and b1=a3. In this case, the UE does not replace the NACK bits with a1 and the final codebook is [a0,NACK,NACK,a3]. That is, even though the UE generated a bit a1 for the second PDSCH in the example, the UE does not know whether it should replace the first NACK or the second NACK with a1. Therefore, the UE maintains both NACK bits in the codebook C that is indicated to the base station in the feedback message.

Lastly, described is a fourth solution to address the situation where there is a mismatch between the DAI sizes in scheduling DCIs. In some aspects, this fourth solution may be adopted where a single cell is configured for the UE and the cDAI in the DCI format 1_2 has one-bit. Broadly, this fourth solution may include the UE receiving one or more first DCI(s) having a first DCI format (e.g., DCI format 1_1/1_0) and a first DAI value (e.g., cDAI) based on a first modulo operator (e.g., modulo four). The UE may also receive one or more second DCIs having a second DCI format (e.g., DCI format 1_2) and second DCI values (e.g., cDAI) based on a second modulo operator (e.g., modulo two). For each of the first DCIs received, the UE may perform a conversion operation on the first DAI value to change the modulo operator from the first modulo operator to the second modulo operator, e.g., from modulo four to modulo two. Accordingly, the UE may generate a codebook based at least on the conversion process and transmit the codebook and a feedback message to the base station.

In this fourth solution, the UE may receive cDAI that are modulo four (e.g., quaternary) in DCI formats 1_1/1_0 and receive cDAI that are modulo two (e.g., binary) in DCI formats 1_2. The UE may first take all cDAI values received in DCI formats 1_0/1_1 and take modulo two of these cDAIs to make them binary (e.g., the conversion operation). The UE may then generate the HARQ-ACK codebook assuming that all HARQ-ACKs are scheduled by DCI formats that has a 1 bit counter DAI. For example, if the UE receives a DCI/PDSCH via DCI format 11 with cDAI=3, the conversion operation may include the UE converting the cDAI to 1 for the corresponding HARQ-ACK.

In some aspects of this fourth solution, in the situation where both DCI formats 1_2 and 1_1/1_0 are configured for the UE, and both can schedule HARQ-ACK of the same priority, and the DAI in DCI format 1_2 has one bit, then the UE may have at least two options. In a first option, the UE performs the above quaternary-to-binary conversion only if it has received a PDSCH scheduled by a DCI using DCI format 1_2. In this option, the UE may perform the conversion operation based on receiving the one or more second DCIs having the second DCI format (e.g., DCI formats 1_1/1_0).

In a second option, the UE may always perform the conversion operation regardless of any particular HARQ-ACK transmission, e.g., regardless of whether it has received a PDSCH/SPS release corresponding to DCI format 1_2. This option may have a higher reliability, e.g., since in the first option the UE and base station may misunderstand each other if the base station transmits the DCI using DCI format 1_2, but the UE misses it.

Accordingly, in some aspects the conversion operation may be performed based on the size configuration for the cDAI indicated in the first DCI format having a two-bit downlink assignment counter (e.g., cDAI=two bits) and the size configuration for the cDAI in the second DCI format having a one-bit downlink assignment counter (e.g., cDAI=one-bit).

In some aspects, the conversion operation may include converting the modulo four of the first modulo operator to a modulo two by applying a modulo operation on the value indicated in the DAI of the first DCI format indicated using modulo four.

Figure 6:
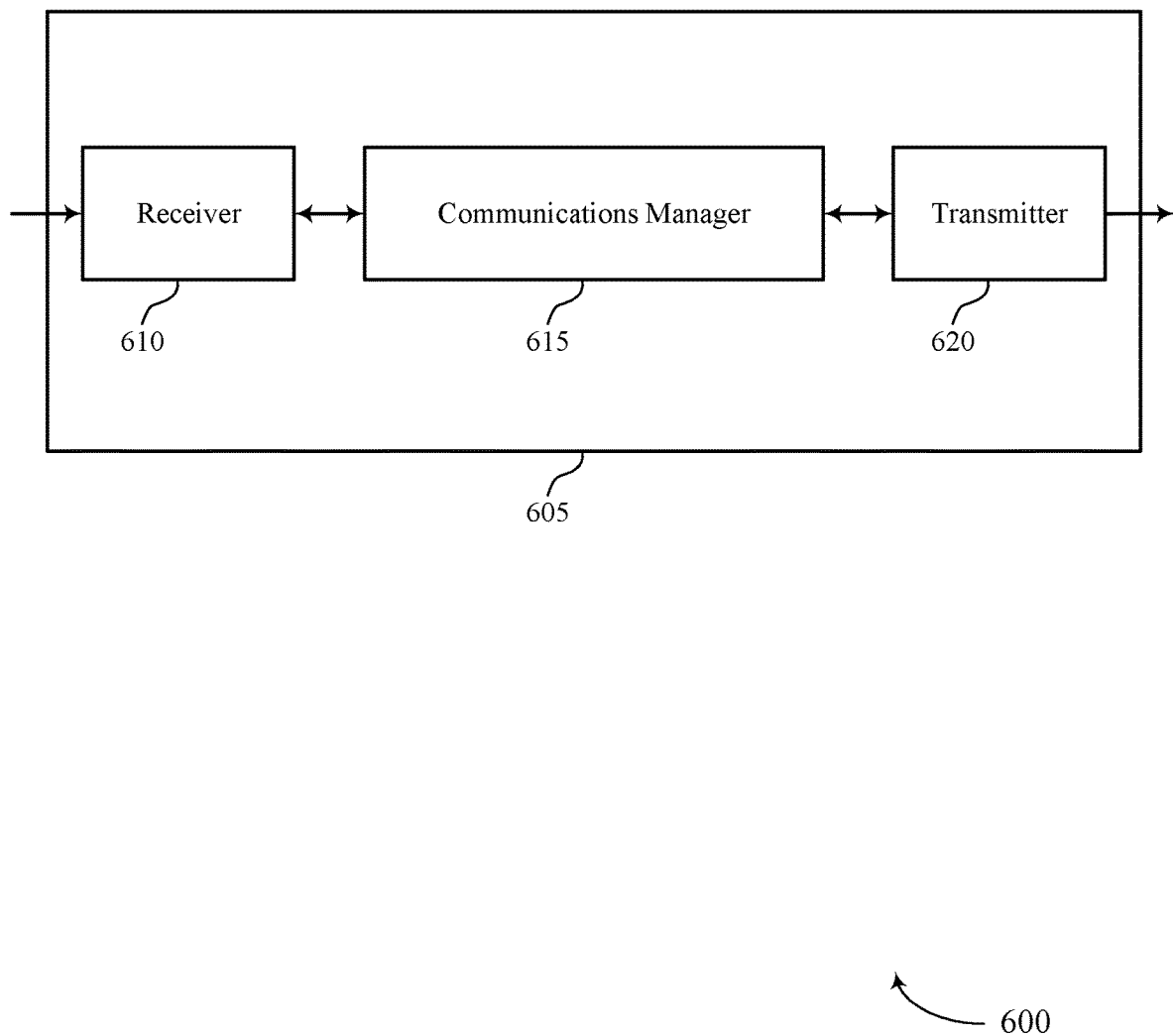
FIGS. 6 and 7 show block diagrams of devices that support hybrid automatic repeat/request-acknowledgement codebook determination with different downlink assignment indicator bitwidth in accordance with aspects of the present disclosure.

FIG. 6 shows a block diagram 600 of a device 605 that supports HARQ-ACK codebook determination with different DAI bitwidth in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to hybrid automatic repeat/request-acknowledgement codebook determination with different DAI bitwidth, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration signal identifying a scheduling constraint for the UE, the scheduling constraint for downlink feedback messages associated with a dynamic codebook configuration and scheduled using a first DCI format, receive a first DCI having the first DCI format, determine, based on the first DCI format, that the scheduling constraint is satisfied, and transmit a feedback message for the first DCI based on the scheduling constraint being satisfied.

The communications manager 615 may also receive a set of one or more first DCI scheduling corresponding first downlink transmissions, each of the one or more first DCI having a unique first downlink assignment counter, receive a set of one or more second DCI scheduling corresponding second downlink transmissions, each of the one or more second DCI having a unique second downlink assignment counter, generate a concatenated codebook for a feedback message based on the first downlink assignment counter in each of the one or more first DCI and the second downlink assignment counter in each of the one or more second DCI, and transmit the feedback message for the first downlink transmissions and the second downlink transmissions indicating the concatenated codebook.

The communications manager 615 may also generate a codebook based on receiving one or more DCI during corresponding control channel monitoring occasions configured for the UE, each received DCI including a first DCI format, identify a negative-acknowledgement bit that is located between two HARQ-ACK bits in the codebook, update the codebook based on the determining, determine that a DCI having a second DCI format was received during a control channel monitoring occasion corresponding to the negative-acknowledgement bit and between control channel monitoring occasions corresponding to the two HARQ-ACK bits, and transmit a feedback message indicating the codebook. The communications manager 615 may also receive one or more first DCI, each first DCI including a first DCI format and a first DAI value based on a first modulo operator, receive one or more second DCI, each second DCI including a second DCI format and a second DAI value based on a second modulo operator, perform, for each received of the first DCI, a conversion operation on the first DAI value to change the modulo operator from the first modulo operator to the second modulo operator, generate a codebook based on the conversion operation, and transmit a feedback message indicating the codebook. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
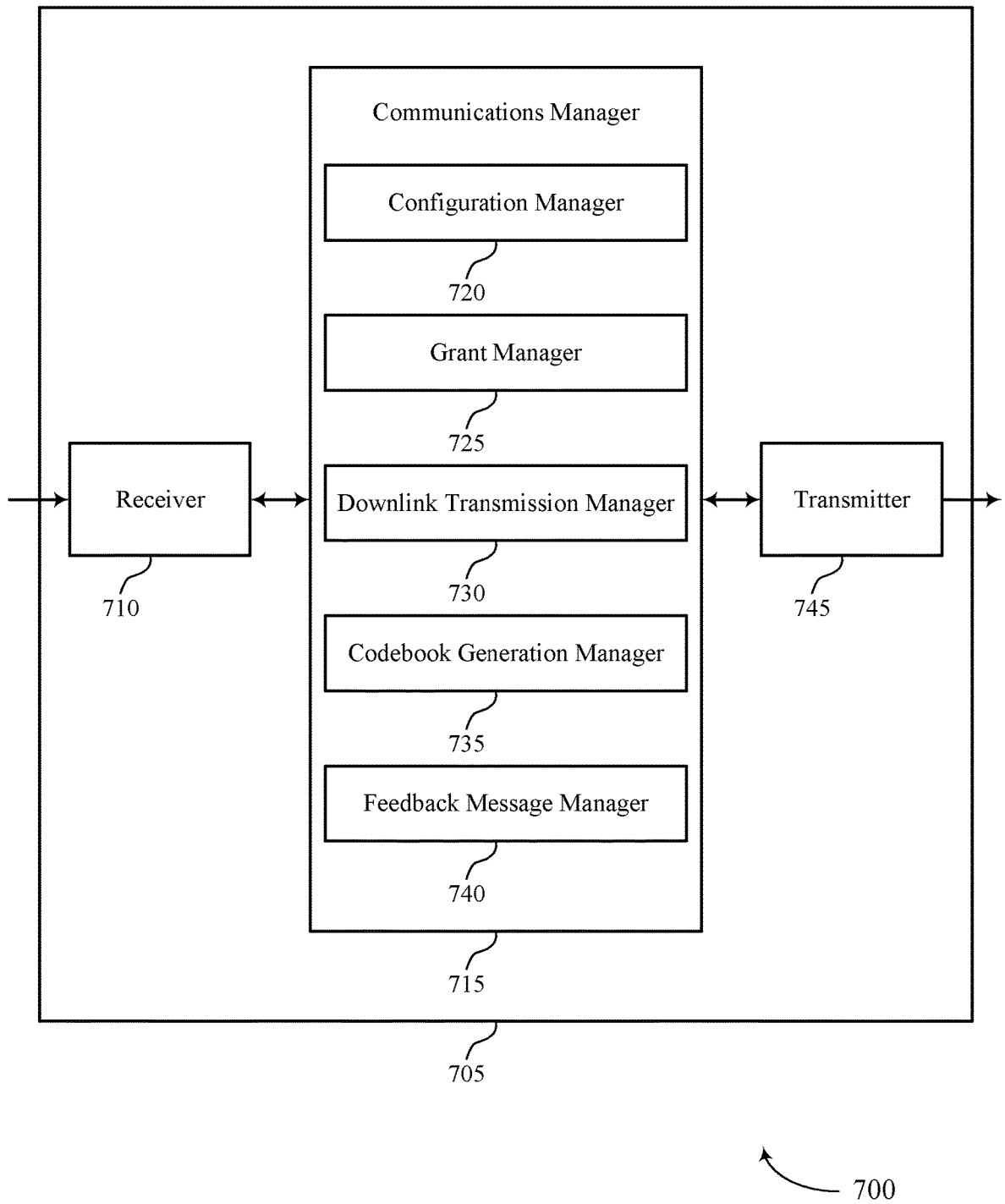

FIG. 7 shows a block diagram 700 of a device 705 that supports HARQ-ACK codebook determination with different DAI bitwidth in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to hybrid automatic repeat/request-acknowledgement codebook determination with different DAI bitwidth, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration manager 720, a grant manager 725, a downlink transmission manager 730, a codebook generation manager 735, and a feedback message manager 740. The communications manager 715 may be an example of aspects of the communications manager 910 described herein.

The configuration manager 720 may receive a configuration signal identifying a scheduling constraint for the UE, the scheduling constraint for downlink feedback messages associated with a dynamic codebook configuration and scheduled using a first DCI format.

The grant manager 725 may receive a first DCI having the first DCI format and determine, based on the first DCI format, that the scheduling constraint is satisfied.

The downlink transmission manager 730 may transmit a feedback message for the first DCI based on the scheduling constraint being satisfied. The downlink transmission manager 730 may monitor for the first downlink transmission based at least in part on the first DCI. The downlink transmission manager 730 may release one or more semi-persistent resources based at least in part on the first DCI.

The downlink transmission manager 730 may transition a secondary cell to a dormancy state based at least in part on the first DCI. For example, the first downlink control information format may be used to schedule a PDSCH reception, or indicate a semi-persistent resource PDSCH release, or indicate SCell dormancy without scheduling a PDSCH reception.

The grant manager 725 may receive a set of one or more first DCI scheduling corresponding first downlink transmissions, each of the one or more first DCI having a unique first downlink assignment counter and receive a set of one or more second DCI scheduling corresponding second downlink transmissions, each of the one or more second DCI having a unique second downlink assignment counter.

The codebook generation manager 735 may generate a concatenated codebook for a feedback message based on the first downlink assignment counter in each of the one or more first DCI and the second downlink assignment counter in each of the one or more second DCI.

The feedback message manager 740 may transmit the feedback message for the first downlink transmissions and the second downlink transmissions indicating the concatenated codebook.

The codebook generation manager 735 may generate a codebook based on receiving one or more DCI during corresponding control channel monitoring occasions configured for the UE, each received DCI including a first DCI format, identify a negative-acknowledgement bit that is located between two hybrid automatic repeat request acknowledgement (HARQ-ACK) bits in the codebook, and update the codebook based on the determining.

The grant manager 725 may determine that a DCI having a second DCI format was received during a control channel monitoring occasion corresponding to the negative-acknowledgement bit and between control channel monitoring occasions corresponding to the two HARQ-ACK bits.

The feedback message manager 740 may transmit a feedback message indicating the codebook.

The grant manager 725 may receive one or more first DCI, each first DCI including a first DCI format and a first DAI value based on a first modulo operator and receive one or more second DCI, each second DCI including a second DCI format and a second DAI value based on a second modulo operator.

The codebook generation manager 735 may perform, for each received of the first DCI, a conversion operation on the first DAI value to change the modulo operator from the first modulo operator to the second modulo operator and generate a codebook based on the conversion operation.

The feedback message manager 740 may transmit a feedback message indicating the codebook.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
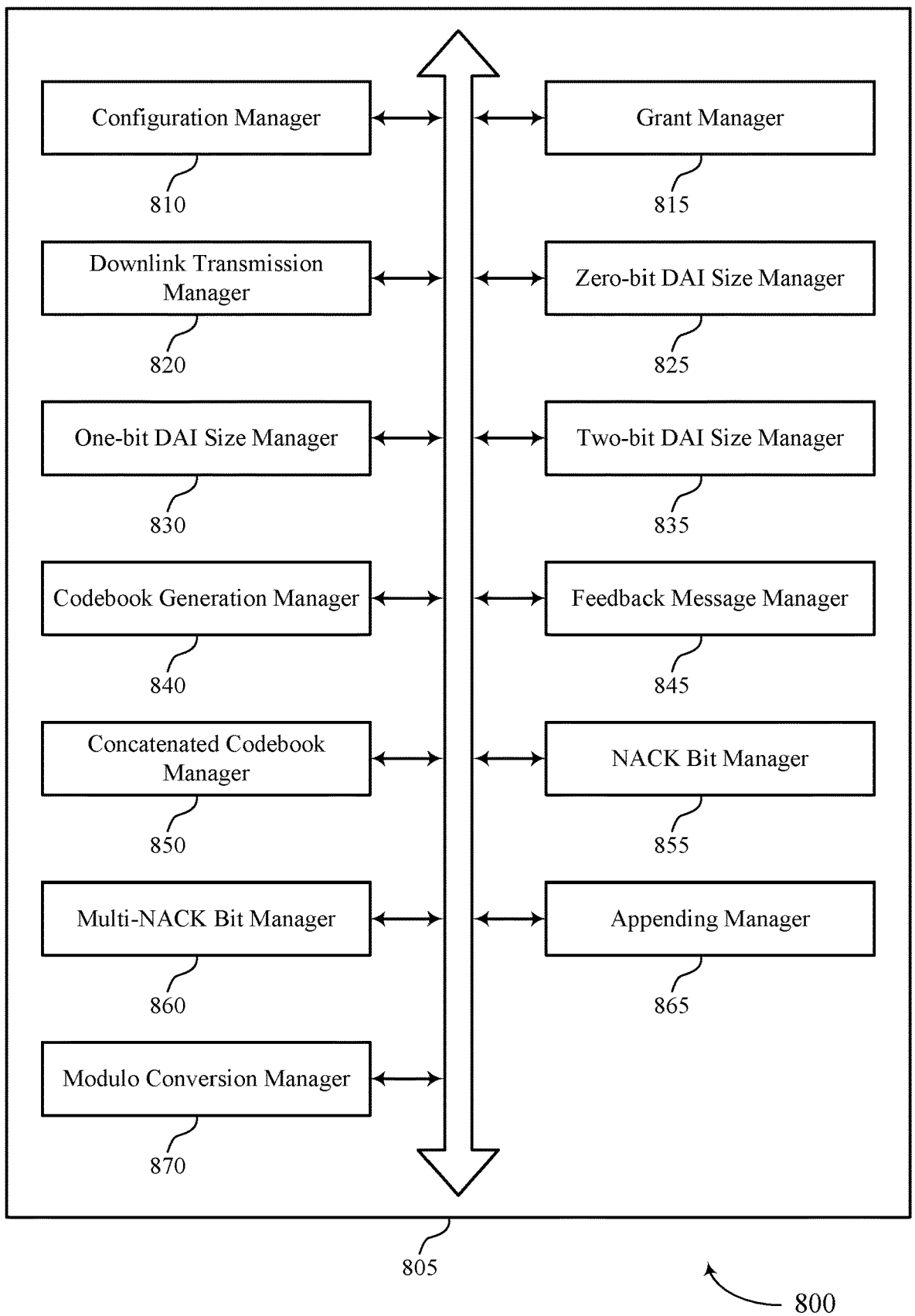
FIG. 8 shows a block diagram of a communications manager that supports HARQ-ACK codebook determination with different DAI bitwidth in accordance with aspects of the present disclosure.

FIG. 8 shows a block diagram 800 of a communications manager 805 that supports HARQ-ACK codebook determination with different DAI bitwidth in accordance with aspects of the present disclosure. The communications manager 805 may be an example of aspects of a communications manager 615, a communications manager 715, or a communications manager 910 described herein. The communications manager 805 may include a configuration manager 810, a grant manager 815, a downlink transmission manager 820, a zero-bit DAI size manager 825, an one-bit DAI size manager 830, a two-bit DAI size manager 835, a codebook generation manager 840, a feedback message manager 845, a concatenated codebook manager 850, a NACK bit manager 855, a multi-NACK bit manager 860, an appending manager 865, and a modulo conversion manager 870. Each of these modules may communicate, directly or indirectly, with one another (e.g., via one or more buses).

The configuration manager 810 may receive a configuration signal identifying a scheduling constraint for the UE, the scheduling constraint for downlink feedback messages associated with a dynamic codebook configuration and scheduled using a first DCI format.

The grant manager 815 may receive a first DCI having the first DCI format. In some examples, the grant manager 815 may determine, based on the first DCI format, that the scheduling constraint is satisfied. In some examples, the grant manager 815 may receive a set of one or more first DCI scheduling corresponding first downlink transmissions, each of the one or more first DCI having a unique first downlink assignment counter. In some examples, the grant manager 815 may receive a set of one or more second DCI scheduling corresponding second downlink transmissions, each of the one or more second DCI having a unique second downlink assignment counter.

In some examples, the grant manager 815 may determine that a DCI having a second DCI format was received during a control channel monitoring occasion corresponding to the negative-acknowledgement bit and between control channel monitoring occasions corresponding to the two HARQ-ACK bits. In some examples, the grant manager 815 may receive one or more first DCI, each first DCI including a first DCI format and a first DAI value based on a first modulo operator. In some examples, the grant manager 815 may receive one or more second DCI, each second DCI including a second DCI format and a second DAI value based on a second modulo operator.

The downlink transmission manager 820 may transmit a feedback message for the first DCI based on the scheduling constraint being satisfied. The downlink transmission manager 820 may monitor for the first downlink transmission based on the first DCI. The downlink transmission manager 820 may release one or more semi-persistent resources based on the first DCI. The downlink transmission manager 820 may transition a secondary cell to a dormancy state based on the first DCI. For example, the first DCI format is used to schedule a PDSCH reception, or indicate a semi-persistent resource PDSCH release, or indicate SCell dormancy without scheduling a PDSCH reception.

The codebook generation manager 840 may generate a concatenated codebook for a feedback message based on the first downlink assignment counter in each of the one or more first DCI and the second downlink assignment counter in each of the one or more second DCI. In some examples, the codebook generation manager 840 may generate a codebook based on receiving one or more DCI during corresponding control channel monitoring occasions configured for the UE, each received DCI including a first DCI format.

In some examples, the codebook generation manager 840 may identify a negative-acknowledgement bit that is located between two HARQ-ACK bits in the codebook. In some examples, the codebook generation manager 840 may update the codebook based on the determining. In some examples, the codebook generation manager 840 may perform, for each received of the first DCI, a conversion operation on the first DAI value to change the modulo operator from the first modulo operator to the second modulo operator. In some examples, the codebook generation manager 840 may generate a codebook based on the conversion operation.

The feedback message manager 845 may transmit the feedback message for the first downlink transmissions and the second downlink transmissions indicating the concatenated codebook. In some examples, the feedback message manager 845 may transmit a feedback message indicating the codebook.

The zero-bit DAI size manager 825 may identify a size configuration for a counter DAI in the first DCI format includes a zero-bit downlink assignment counter. In some examples, the zero-bit DAI size manager 825 may receive a second DCI having the first DCI format. In some examples, the zero-bit DAI size manager 825 may determine, based on the second DCI, that a first feedback message for the first DCI is to be multiplexed with a second feedback message for the second DCI. In some examples, the zero-bit DAI size manager 825 may determine, based on the first DCI format of the first DCI, that the second DCI does not satisfy the scheduling constraint. In some examples, the zero-bit DAI size manager 825 may determine, based on the second DCI not satisfying the scheduling constraint, that a scheduling error has occurred.

In some examples, the zero-bit DAI size manager 825 may receive a second DCI having a second DCI format. In some examples, the zero-bit DAI size manager 825 may determine, based on the second DCI format, that the second DCI satisfies the scheduling constraint. In some examples, the zero-bit DAI size manager 825 may monitor for a second downlink transmission based on the second DCI satisfying the scheduling constraint. In some examples, the zero-bit DAI size manager 825 may transmit the feedback message for the first downlink transmission and the second downlink transmission based on the monitoring.

The one-bit DAI size manager 830 may receive a second DCI having a second DCI format. In some examples, the one-bit DAI size manager 830 may determine, based on the second DCI, that a first feedback message for the first DCI is to be multiplexed with a second feedback message for the second DCI. In some examples, the one-bit DAI size manager 830 may determine, based on the second DCI format for the second DCI, that the second DCI does not satisfy the scheduling constraint. In some examples, the one-bit DAI size manager 830 may determine, based on the second DCI not satisfying the scheduling constraint, that a scheduling error has occurred.

In some examples, the one-bit DAI size manager 830 may receive a second DCI. In some examples, the one-bit DAI size manager 830 may determine, based on the first DCI format for the second DCI, that the second DCI satisfies the scheduling constraint. In some examples, the one-bit DAI size manager 830 may monitor for a second downlink transmission based on the second DCI satisfying the scheduling constraint. In some examples, the one-bit DAI size manager 830 may transmit the feedback message for the first DCI and the second DCI based on the monitoring. In some cases, a size configuration for a counter DAI in the first DCI format include a one-bit downlink assignment counter.

The two-bit DAI size manager 835 may receive a second DCI having a second DCI format, where a size configuration for a DAI in the first DCI format is associated with either a zero-bit or a one-bit downlink assignment counter and the size configuration for the DAI in the second DCI format is associated with a two-bit downlink assignment counter. In some examples, the two-bit DAI size manager 835 may determine that the feedback message for the first DCI is to be multiplexed with a second feedback message for the second DCI. In some examples, the two-bit DAI size manager 835 may determine, based on the first DCI format of the first DCI and the second DCI format of the second DCI, that the second DCI satisfies the scheduling constraint. In some examples, the two-bit DAI size manager 835 may increment a total DAI value associated with the first downlink transmission and the second downlink transmission based on a first counter DAI indicated in the first DCI and a second counter DAI indicated in the second DCI.

The concatenated codebook manager 850 may increment, for each first DCI, a first total DAI value associated with the first downlink transmissions. In some examples, the concatenated codebook manager 850 may increment, for each second DCI, a second total DAI value associated with the second downlink transmissions, where the concatenated codebook is based on the first total DAI value and the second total DAI value. In some examples, the concatenated codebook manager 850 may increment, for each first DCI, a first counter DAI value associated with the first downlink transmissions. In some examples, the concatenated codebook manager 850 may increment, for each second DCI, a second counter DAI value associated with the second downlink transmissions, where the concatenated codebook is based on the first counter DAI value and the second counter DAI value.

The NACK bit manager 855 may replace the negative-acknowledgement bit with a HARQ-ACK bit selected based on a decoding result of the second DCI having the second DCI format.

The multi-NACK bit manager 860 may determine that a number of consecutive negative-acknowledgement bits located between HARQ-ACK bits is not equal to a number of HARQ-ACK bits corresponding to the second DCI. In some examples, the multi-NACK bit manager 860 may maintain the two negative-acknowledgement bits in the codebook based on the determining.

The appending manager 865 may determine that one or more DCI having the second DCI format were received during control channel monitoring occasions occurring after a control channel monitoring occasion corresponding to a last bit in the codebook. In some examples, the appending manager 865 may append the codebook with one or more bits, each bit corresponding to the at least one of the one or more DCI.

The modulo conversion manager 870 may first modulo operator includes a modulo four and the second modulo operator includes a modulo two. In some examples, the modulo conversion manager 870 may convert the modulo four of the first modulo operator to a modulo two by applying a modulo two operation on a value indicated in the DAI of the first DCI format indicated using modulo four. In some cases, the conversion operation is performed based on a size configuration for a counter DAI in the first DCI format including a two-bit downlink assignment counter and the size configuration for the counter DAI in the second DCI format including a one-bit downlink assignment counter. In some cases, the conversion operation is performed based on receiving the one or more second DCI having the second DCI format.

Figure 9:
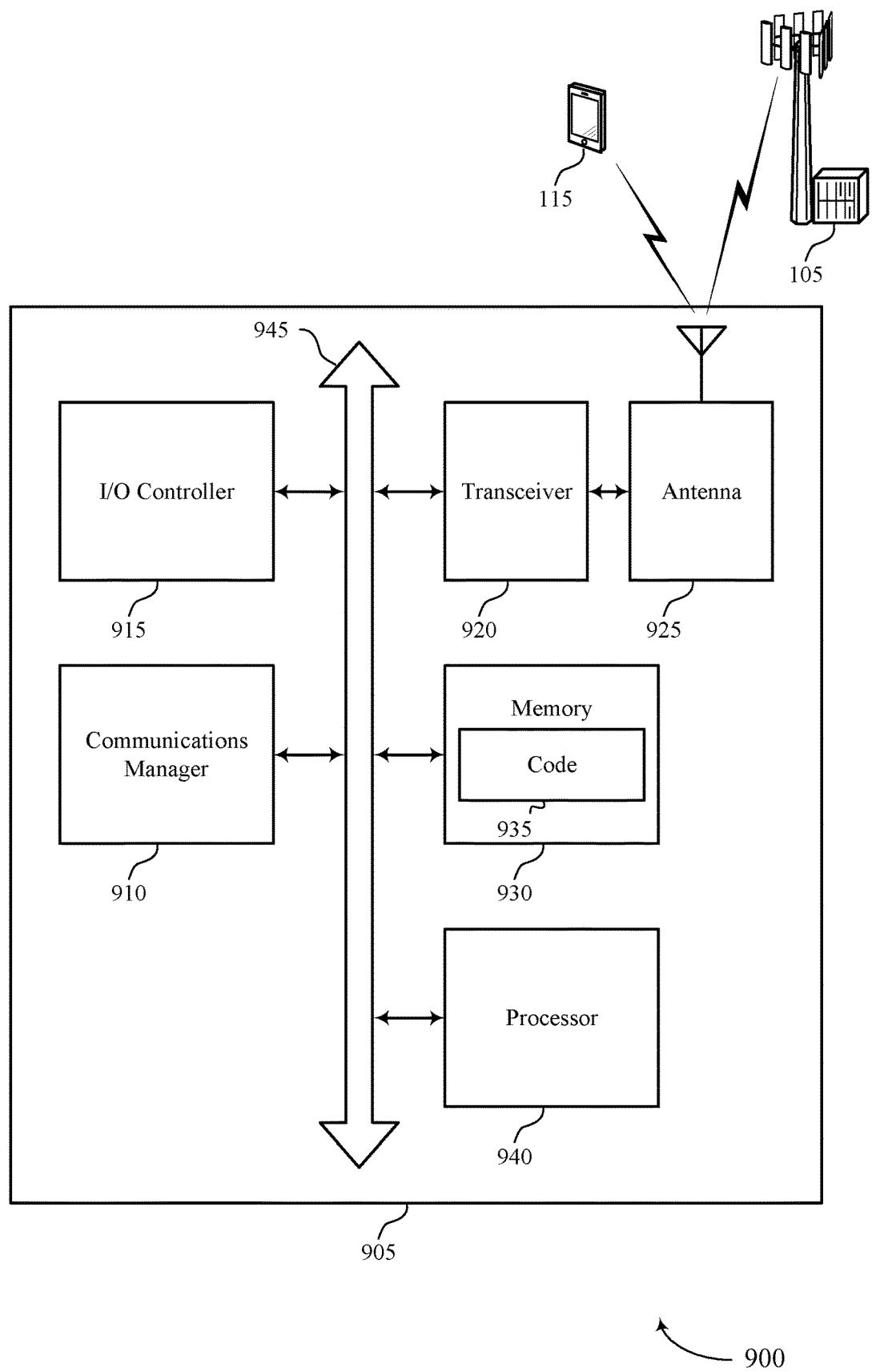
FIG. 9 shows a diagram of a system including a device that supports HARQ-ACK codebook determination with different DAI bitwidth in accordance with aspects of the present disclosure.

FIG. 9 shows a diagram of a system 900 including a device 905 that supports HARQ-ACK codebook determination with different DAI bitwidth in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration signal identifying a scheduling constraint for the UE, the scheduling constraint for downlink feedback messages associated with a dynamic codebook configuration and scheduled using a first DCI format, receive a first DCI having the first DCI format, determine, based on the first DCI format, that the scheduling constraint is satisfied, and transmit a feedback message for the first DCI based on the scheduling constraint being satisfied.

The communications manager 910 may also receive a set of one or more first DCI scheduling corresponding first downlink transmissions, each of the one or more first DCI having a unique first downlink assignment counter, receive a set of one or more second DCI scheduling corresponding second downlink transmissions, each of the one or more second DCI having a unique second downlink assignment counter, generate a concatenated codebook for a feedback message based on the first downlink assignment counter in each of the one or more first DCI and the second downlink assignment counter in each of the one or more second DCI, and transmit the feedback message for the first downlink transmissions and the second downlink transmissions indicating the concatenated codebook.

The communications manager 910 may also generate a codebook based on receiving one or more DCI during corresponding control channel monitoring occasions configured for the UE, each received DCI including a first DCI format, identify a negative-acknowledgement bit that is located between two HARQ-ACK bits in the codebook, update the codebook based on the determining, determine that a DCI having a second DCI format was received during a control channel monitoring occasion corresponding to the negative-acknowledgement bit and between control channel monitoring occasions corresponding to the two HARQ-ACK bits, and transmit a feedback message indicating the codebook.

The communications manager 910 may also receive one or more first DCI, each first DCI including a first DCI format and a first DAI value based on a first modulo operator, receive one or more second DCI, each second DCI including a second DCI format and a second DAI value based on a second modulo operator, perform, for each received of the first DCI, a conversion operation on the first DAI value to change the modulo operator from the first modulo operator to the second modulo operator, generate a codebook based on the conversion operation, and transmit a feedback message indicating the codebook.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting hybrid automatic repeat/request-acknowledgement codebook determination with different DAI bitwidth).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
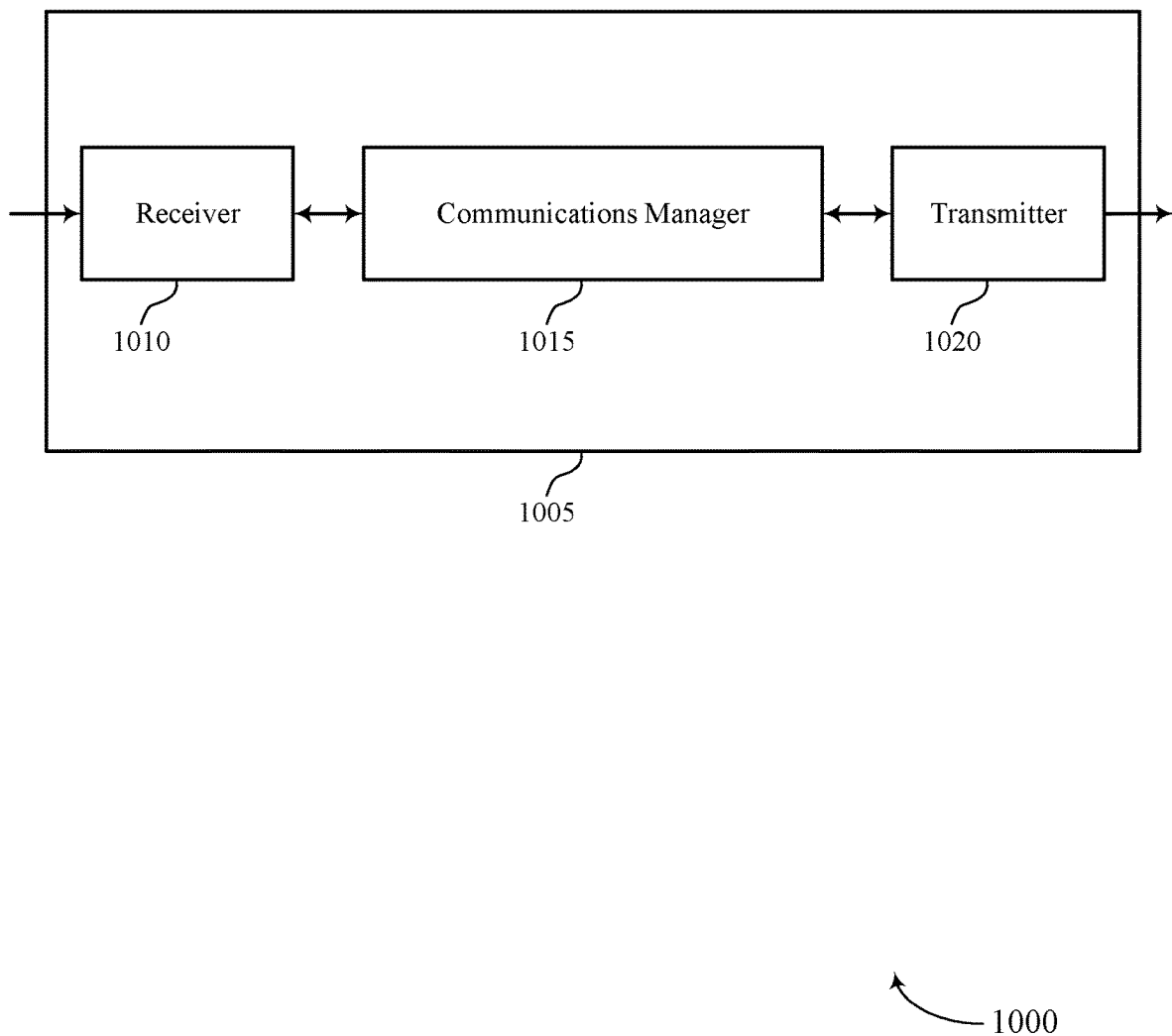
FIGS. 10 and 11 show block diagrams of devices that support hybrid automatic repeat/request-acknowledgement codebook determination with different downlink assignment indicator bitwidth in accordance with aspects of the present disclosure.

FIG. 10 shows a block diagram 1000 of a device 1005 that supports HARQ-ACK codebook determination with different DAI bitwidth in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to hybrid automatic repeat/request-acknowledgement codebook determination with different DAI bitwidth, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a configuration signal identifying a scheduling constraint for a UE, the scheduling constraint for downlink feedback messages associated with a dynamic codebook configuration and scheduled using a first DCI format, transmit a first DCI having the first DCI format, and receive a feedback message for the first DCI based on the scheduling constraint being satisfied. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
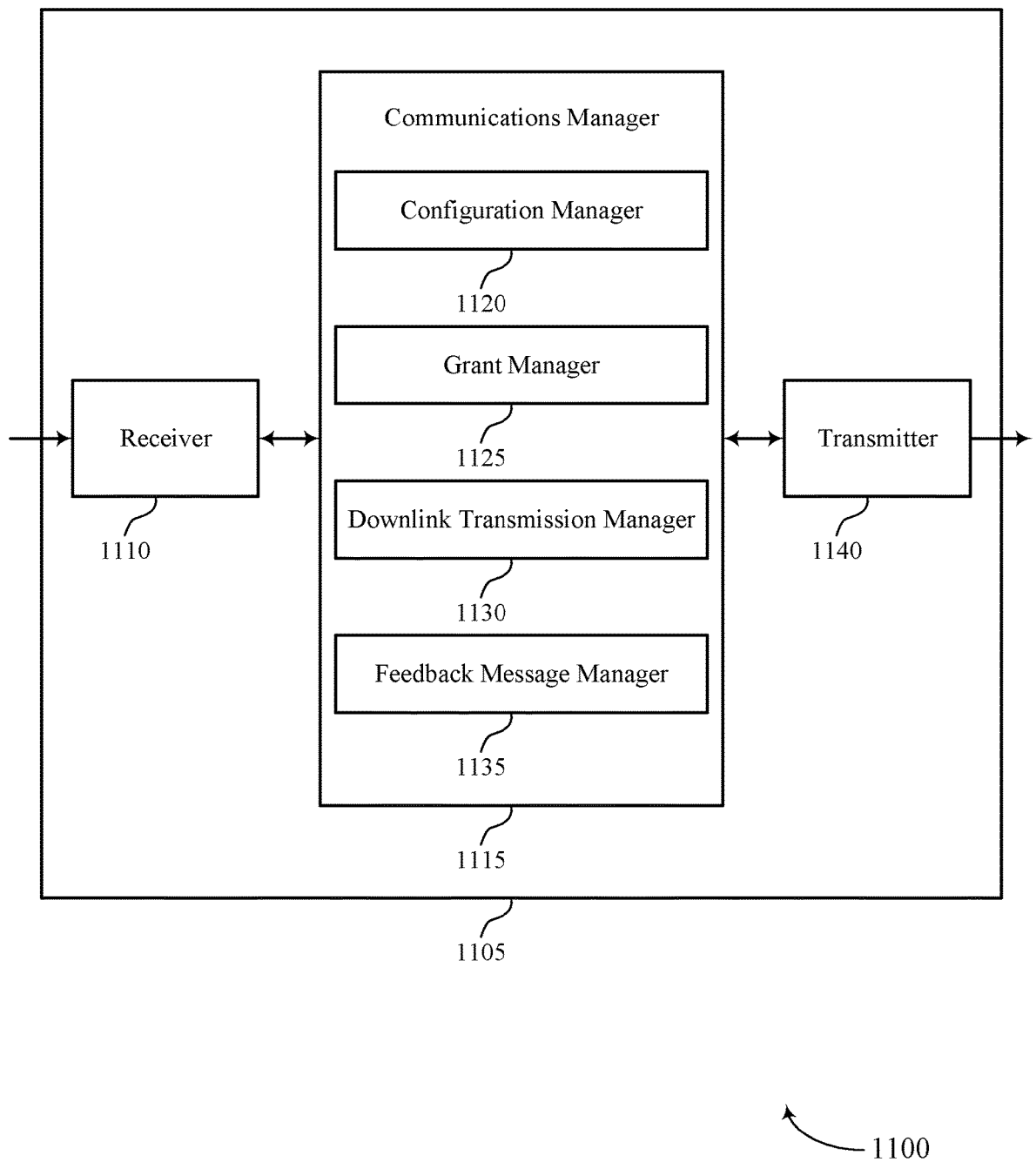

FIG. 11 shows a block diagram 1100 of a device 1105 that supports HARQ-ACK codebook determination with different DAI bitwidth in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to hybrid automatic repeat/request-acknowledgement codebook determination with different DAI bitwidth, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration manager 1120, a grant manager 1125, a downlink transmission manager 1130, and a feedback message manager 1135. The communications manager 1115 may be an example of aspects of the communications manager 1310 described herein.

The configuration manager 1120 may transmit a configuration signal identifying a scheduling constraint for a UE, the scheduling constraint for downlink feedback messages associated with a dynamic codebook configuration and scheduled using a first DCI format.

The grant manager 1125 may transmit a first DCI having the first DCI format.

The downlink transmission manager 1130 may transmit the first downlink transmission based on the first DCI.

The feedback message manager 1135 may receive a feedback message for the first DCI based on the scheduling constraint being satisfied.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
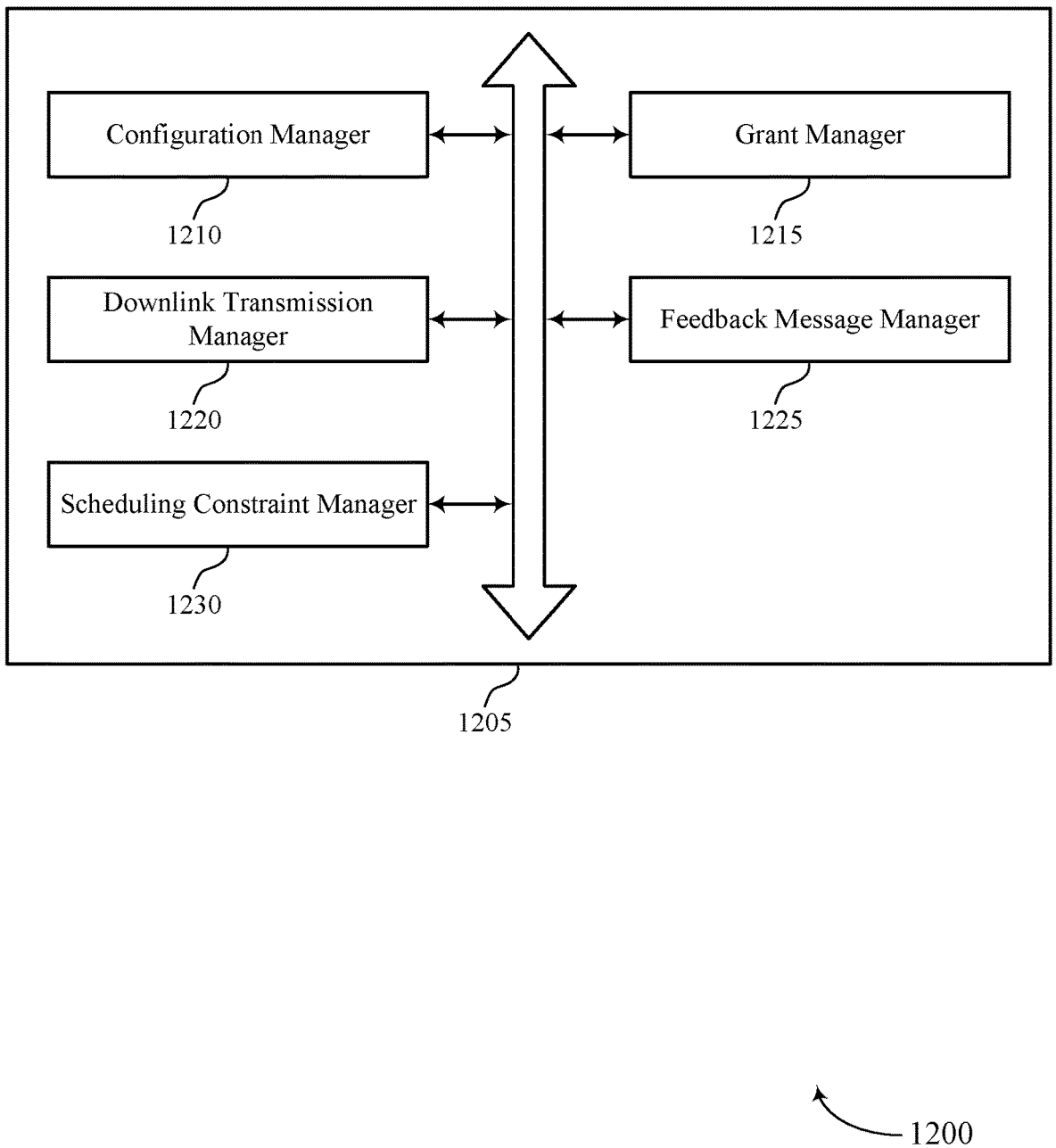
FIG. 12 shows a block diagram of a communications manager that supports HARQ-ACK codebook determination with different DAI bitwidth in accordance with aspects of the present disclosure.

FIG. 12 shows a block diagram 1200 of a communications manager 1205 that supports HARQ-ACK codebook determination with different DAI bitwidth in accordance with aspects of the present disclosure. The communications manager 1205 may be an example of aspects of a communications manager 1015, a communications manager 1115, or a communications manager 1310 described herein. The communications manager 1205 may include a configuration manager 1210, a grant manager 1215, a downlink transmission manager 1220, a feedback message manager 1225, and a scheduling constraint manager 1230. Each of these modules may communicate, directly or indirectly, with one another (e.g., via one or more buses).

The configuration manager 1210 may transmit a configuration signal identifying a scheduling constraint for a UE, the scheduling constraint for downlink feedback messages associated with a dynamic codebook configuration and scheduled using a first DCI format.

The grant manager 1215 may transmit a first DCI having the first DCI format.

The downlink transmission manager 1220 may transmit the first downlink transmission based on the first DCI. The downlink transmission manager 1220 may release one or more semi-persistent resources based on the first DCI. The downlink transmission manager 1220 may transition a secondary cell to a dormancy state based on the first DCI. The feedback message manager 1225 may receive a feedback message for the first DCI based on the first DCI satisfying the scheduling constraint. For example, the first DCI format may be used to schedule a PDSCH reception, or indicate a semi-persistent resource PDSCH release, or indicate SCell dormancy without scheduling a PDSCH reception.

The scheduling constraint manager 1230 may refrain from transmitting DCI having a second DCI format based on the scheduling constraint.

Figure 13:
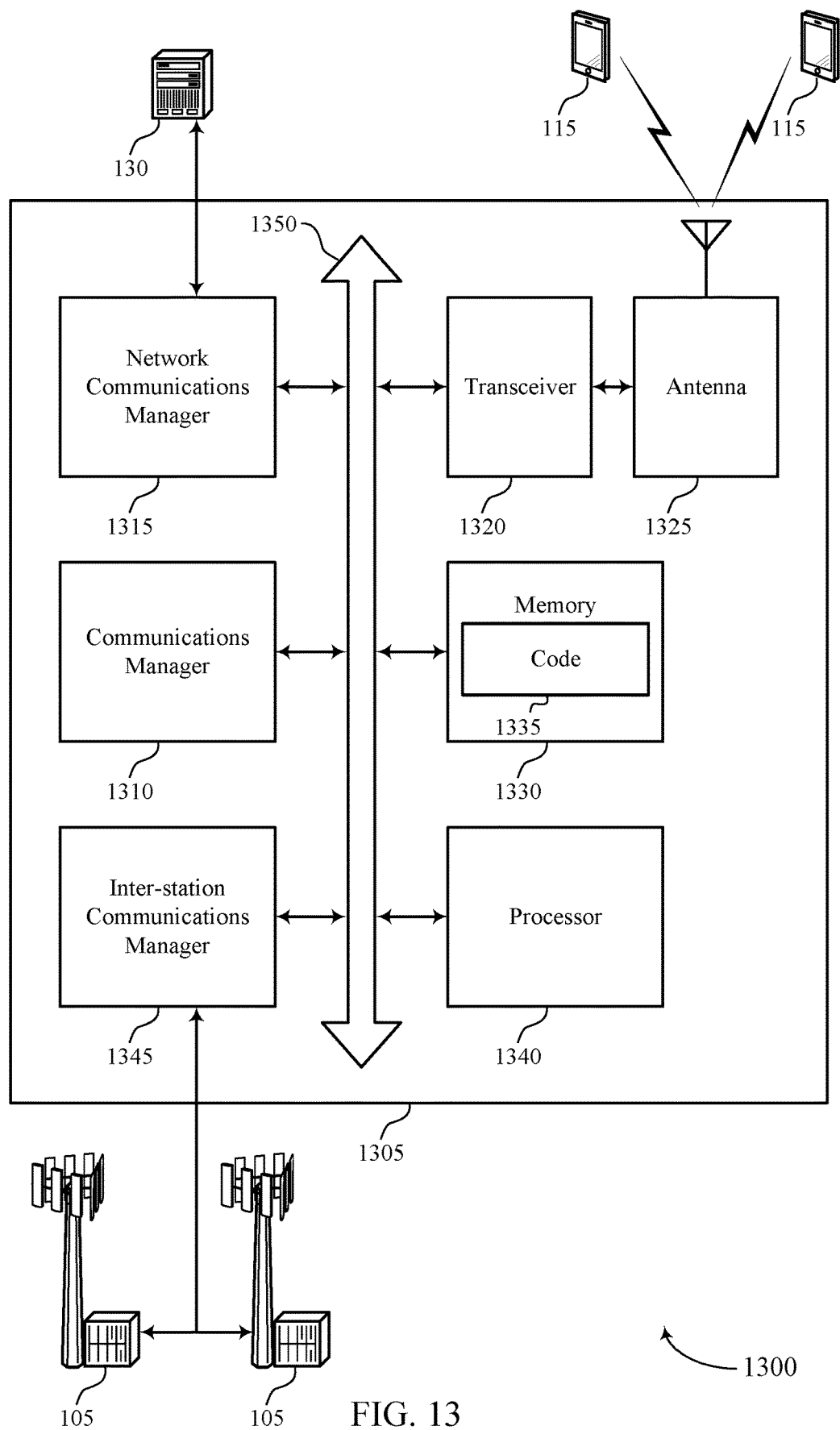
FIG. 13 shows a diagram of a system including a device that supports HARQ-ACK codebook determination with different DAI bitwidth in accordance with aspects of the present disclosure.

FIG. 13 shows a diagram of a system 1300 including a device 1305 that supports HARQ-ACK codebook determination with different DAI bitwidth in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a configuration signal identifying a scheduling constraint for a UE, the scheduling constraint for downlink feedback messages associated with a dynamic codebook configuration and scheduled using a first DCI format, transmit a first DCI having the first DCI format, and receive a feedback message for the first DCI based on the scheduling constraint being satisfied.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting hybrid automatic repeat/request-acknowledgement codebook determination with different DAI bitwidth).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
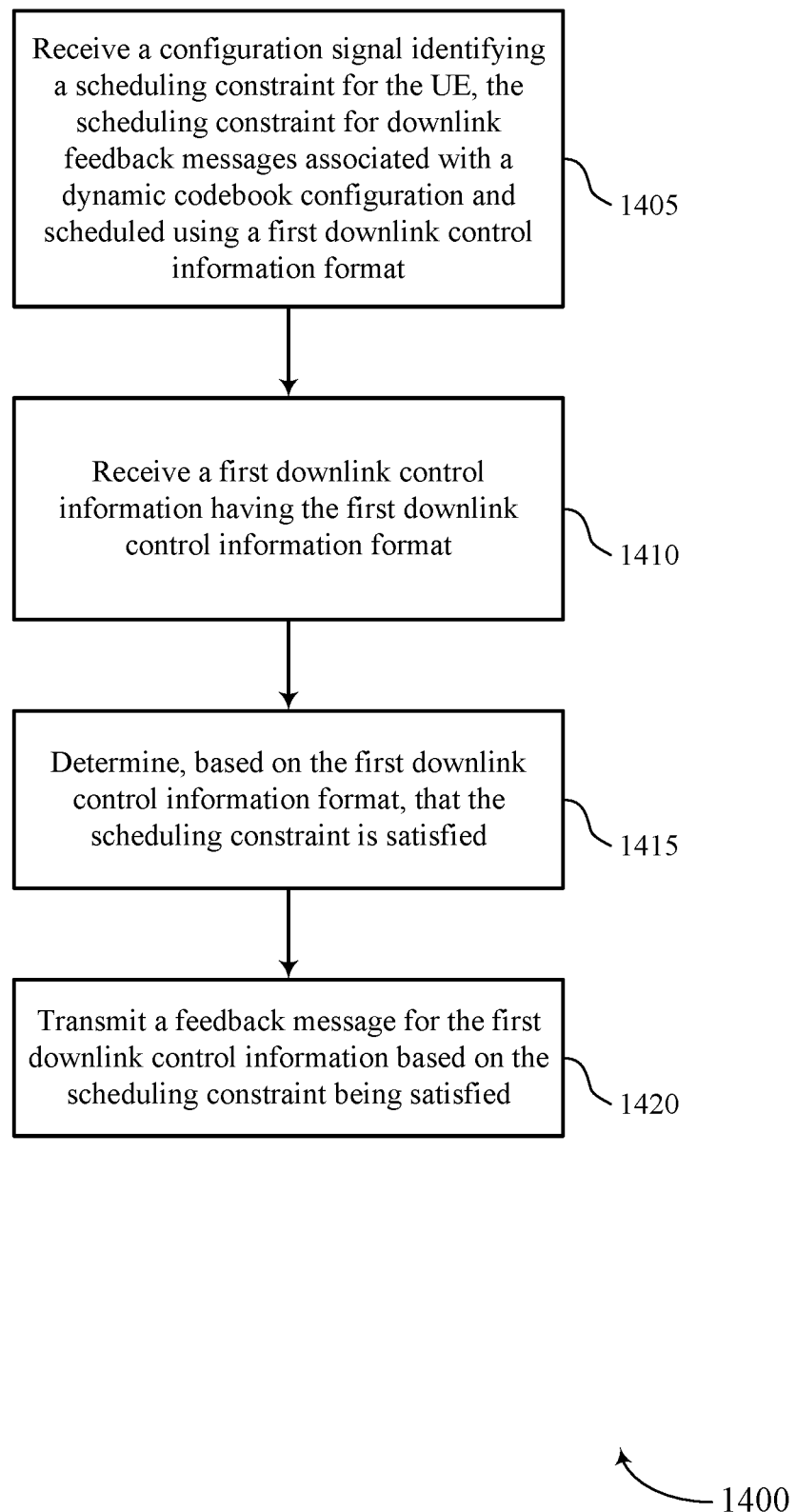
FIGS. 14 through 18 show flowcharts illustrating methods that support hybrid automatic repeat/request-acknowledgement codebook determination with different downlink assignment indicator bitwidth in accordance with aspects of the present disclosure.

FIG. 14 shows a flowchart illustrating a method 1400 that supports HARQ-ACK codebook determination with different DAI bitwidth in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a configuration signal identifying a scheduling constraint for the UE, the scheduling constraint for downlink feedback messages associated with a dynamic codebook configuration and scheduled using a first DCI format. The operations of 1405 may be performed according to the methods described herein. In some examples, aspects of the operations of 1405 may be performed by a configuration manager as described with reference to FIGS. 6 through 9.

At 1410, the UE may receive a first DCI having the first DCI format. The operations of 1410 may be performed according to the methods described herein. In some examples, aspects of the operations of 1410 may be performed by a grant manager as described with reference to FIGS. 6 through 9.

At 1415, the UE may determine, based on the first DCI format, that the scheduling constraint is satisfied. The operations of 1415 may be performed according to the methods described herein. In some examples, aspects of the operations of 1415 may be performed by a grant manager as described with reference to FIGS. 6 through 9.

At 1420, the UE may transmit a feedback message for the first DCI based on the scheduling constraint being satisfied. The operations of 1420 may be performed according to the methods described herein. In some examples, aspects of the operations of 1420 may be performed by a downlink transmission manager as described with reference to FIGS. 6 through 9.

Figure 15:
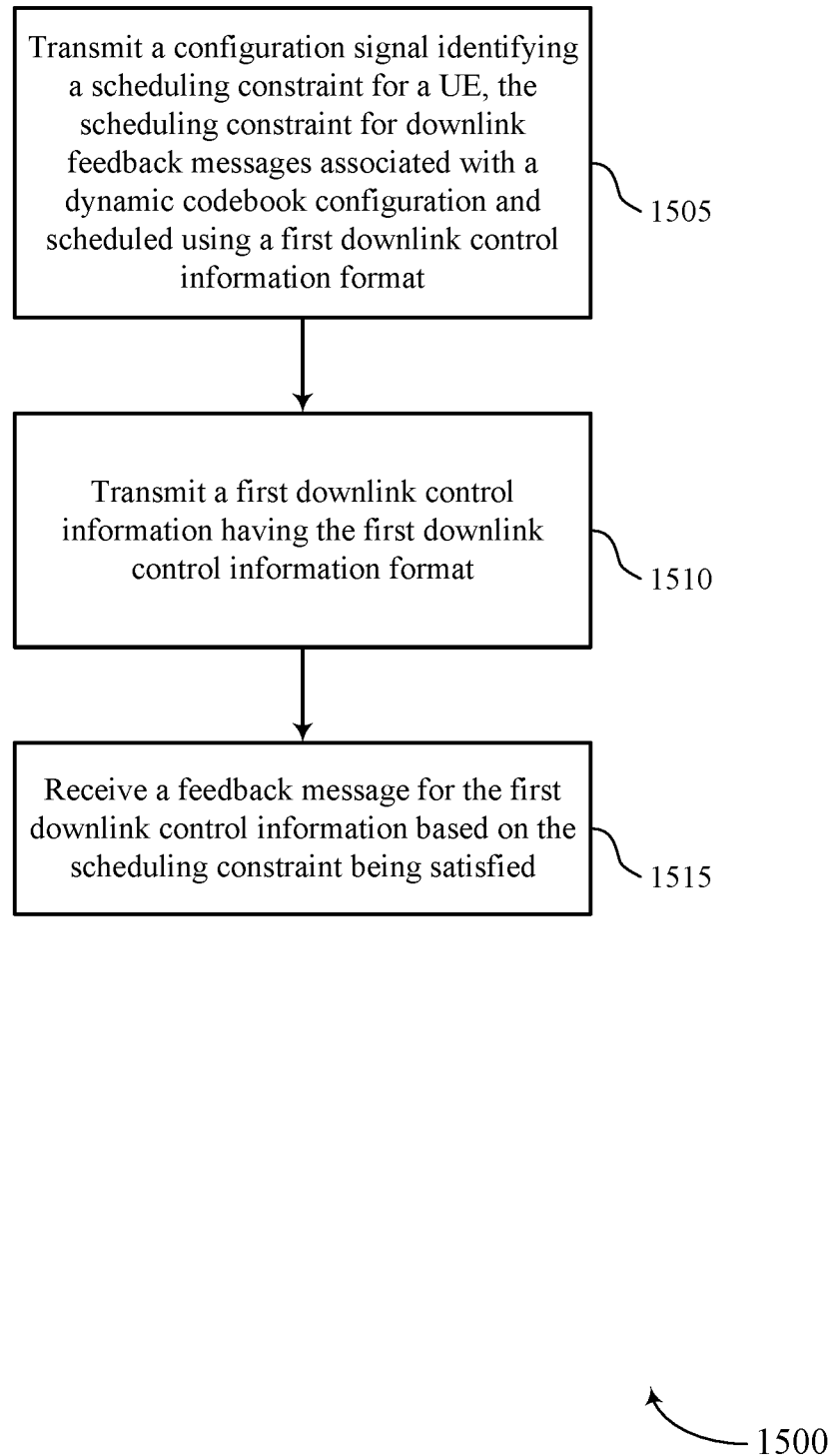

FIG. 15 shows a flowchart illustrating a method 1500 that supports HARQ-ACK codebook determination with different DAI bitwidth in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit a configuration signal identifying a scheduling constraint for a UE, the scheduling constraint for downlink feedback messages associated with a dynamic codebook configuration and scheduled using a first DCI format. The operations of 1505 may be performed according to the methods described herein. In some examples, aspects of the operations of 1505 may be performed by a configuration manager as described with reference to FIGS. 10 through 13.

At 1510, the base station may transmit a first DCI having the first DCI format. The operations of 1510 may be performed according to the methods described herein. In some examples, aspects of the operations of 1510 may be performed by a grant manager as described with reference to FIGS. 10 through 13.

At 1515, the base station may receive a feedback message for the first DCI based on the scheduling constraint being satisfied. The operations of 1515 may be performed according to the methods described herein. In some examples, aspects of the operations of 1515 may be performed by a feedback message manager as described with reference to FIGS. 10 through 13.

Figure 16:
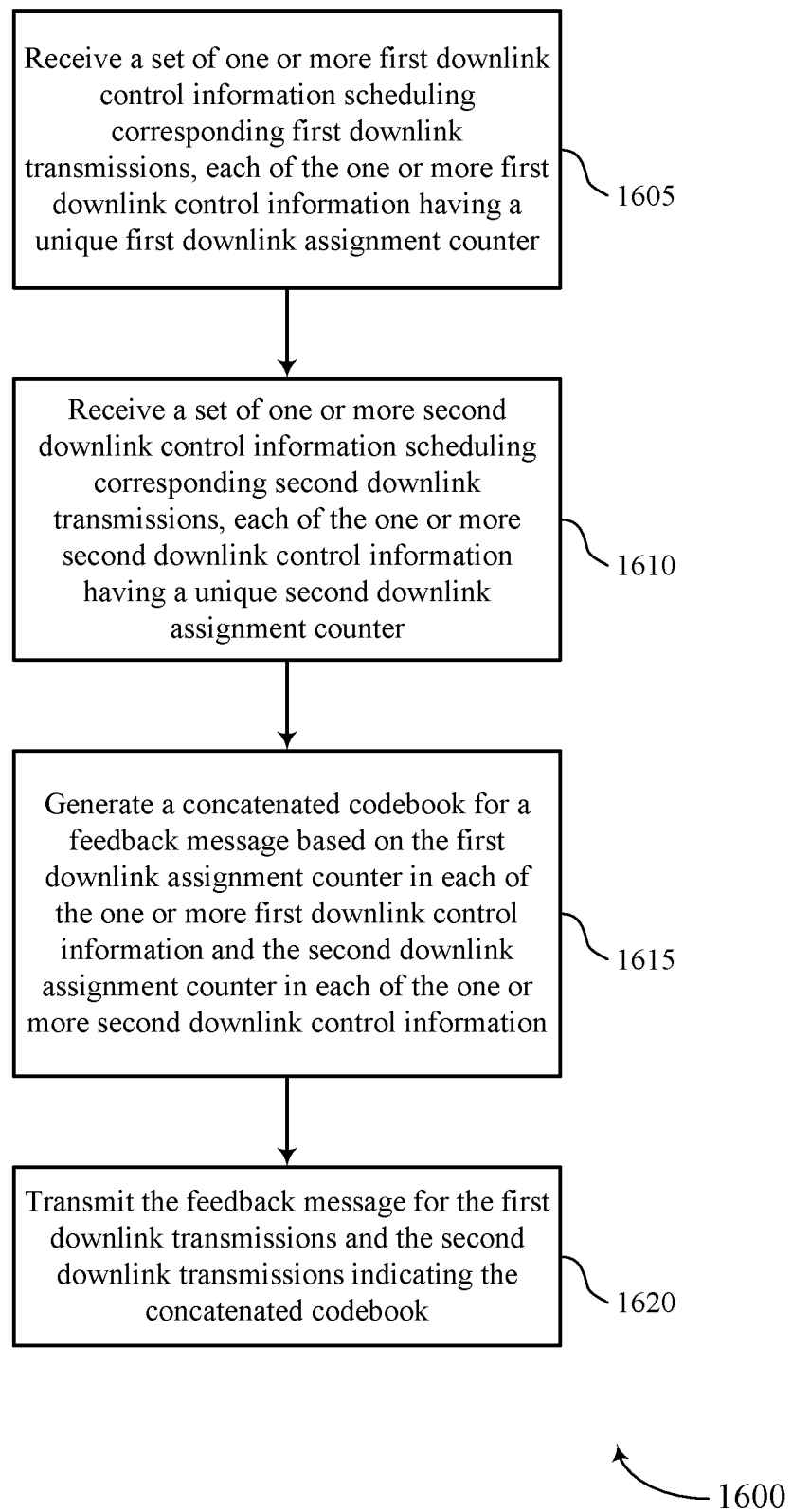

FIG. 16 shows a flowchart illustrating a method 1600 that supports HARQ-ACK codebook determination with different DAI bitwidth in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a set of one or more first DCI scheduling corresponding first downlink transmissions, each of the one or more first DCI having a unique first downlink assignment counter. The operations of 1605 may be performed according to the methods described herein. In some examples, aspects of the operations of 1605 may be performed by a grant manager as described with reference to FIGS. 6 through 9.

At 1610, the UE may receive a set of one or more second DCI scheduling corresponding second downlink transmissions, each of the one or more second DCI having a unique second downlink assignment counter. The operations of 1610 may be performed according to the methods described herein. In some examples, aspects of the operations of 1610 may be performed by a grant manager as described with reference to FIGS. 6 through 9.

At 1615, the UE may generate a concatenated codebook for a feedback message based on the first downlink assignment counter in each of the one or more first DCI and the second downlink assignment counter in each of the one or more second DCI. The operations of 1615 may be performed according to the methods described herein. In some examples, aspects of the operations of 1615 may be performed by a codebook generation manager as described with reference to FIGS. 6 through 9.

At 1620, the UE may transmit the feedback message for the first downlink transmissions and the second downlink transmissions indicating the concatenated codebook. The operations of 1620 may be performed according to the methods described herein. In some examples, aspects of the operations of 1620 may be performed by a feedback message manager as described with reference to FIGS. 6 through 9.

Figure 17:
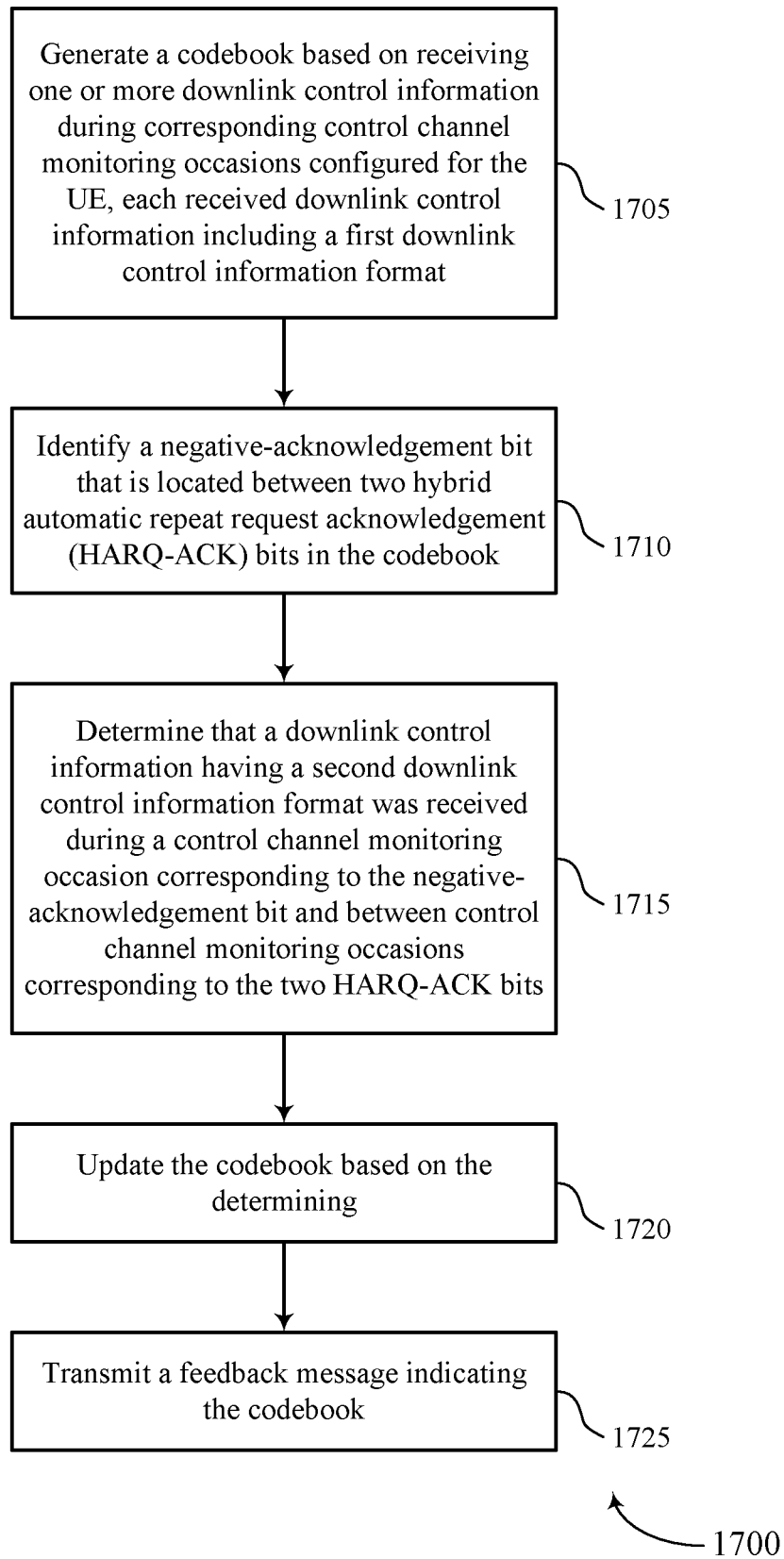

FIG. 17 shows a flowchart illustrating a method 1700 that supports HARQ-ACK codebook determination with different DAI bitwidth in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may generate a codebook based on receiving one or more DCI during corresponding control channel monitoring occasions configured for the UE, each received DCI including a first DCI format. The operations of 1705 may be performed according to the methods described herein. In some examples, aspects of the operations of 1705 may be performed by a codebook generation manager as described with reference to FIGS. 6 through 9.

At 1710, the UE may identify a negative-acknowledgement bit that is located between two HARQ-ACK bits in the codebook. The operations of 1710 may be performed according to the methods described herein. In some examples, aspects of the operations of 1710 may be performed by a codebook generation manager as described with reference to FIGS. 6 through 9.

At 1715, the UE may determine that a DCI having a second DCI format was received during a control channel monitoring occasion corresponding to the negative-acknowledgement bit and between control channel monitoring occasions corresponding to the two HARQ-ACK bits. The operations of 1715 may be performed according to the methods described herein. In some examples, aspects of the operations of 1715 may be performed by a grant manager as described with reference to FIGS. 6 through 9.

At 1720, the UE may update the codebook based on the determining. The operations of 1720 may be performed according to the methods described herein. In some examples, aspects of the operations of 1720 may be performed by a codebook generation manager as described with reference to FIGS. 6 through 9.

At 1725, the UE may transmit a feedback message indicating the codebook. The operations of 1725 may be performed according to the methods described herein. In some examples, aspects of the operations of 1725 may be performed by a feedback message manager as described with reference to FIGS. 6 through 9.

Figure 18:
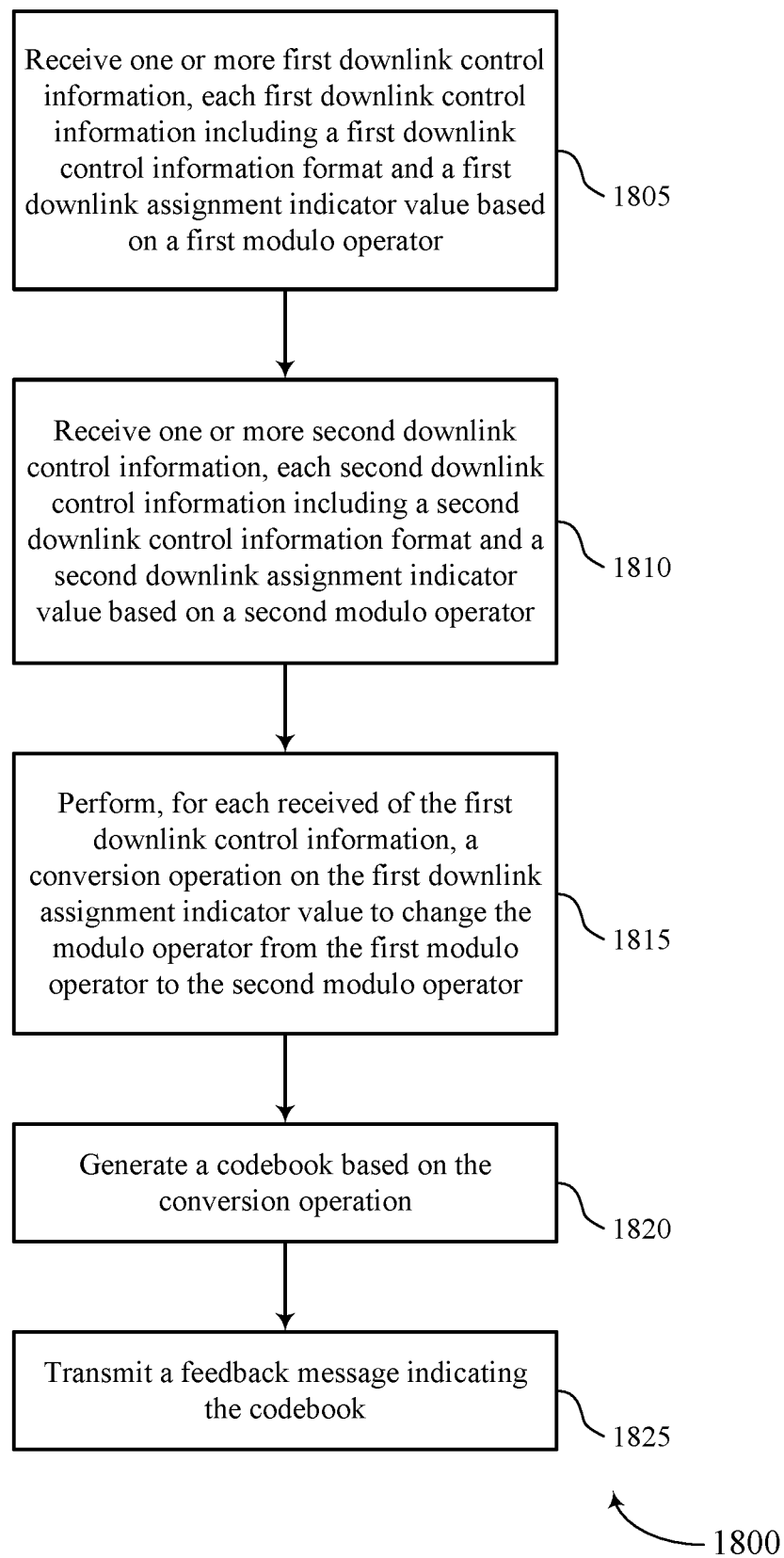

FIG. 18 shows a flowchart illustrating a method 1800 that supports HARQ-ACK codebook determination with different DAI bitwidth in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive one or more first DCI, each first DCI including a first DCI format and a first DAI value based on a first modulo operator. The operations of 1805 may be performed according to the methods described herein. In some examples, aspects of the operations of 1805 may be performed by a grant manager as described with reference to FIGS. 6 through 9.

At 1810, the UE may receive one or more second DCI, each second DCI including a second DCI format and a second DAI value based on a second modulo operator. The operations of 1810 may be performed according to the methods described herein. In some examples, aspects of the operations of 1810 may be performed by a grant manager as described with reference to FIGS. 6 through 9.

At 1815, the UE may perform, for each received of the first DCI, a conversion operation on the first DAI value to change the modulo operator from the first modulo operator to the second modulo operator. The operations of 1815 may be performed according to the methods described herein. In some examples, aspects of the operations of 1815 may be performed by a codebook generation manager as described with reference to FIGS. 6 through 9.

At 1820, the UE may generate a codebook based on the conversion operation. The operations of 1820 may be performed according to the methods described herein. In some examples, aspects of the operations of 1820 may be performed by a codebook generation manager as described with reference to FIGS. 6 through 9.

At 1825, the UE may transmit a feedback message indicating the codebook. The operations of 1825 may be performed according to the methods described herein. In some examples, aspects of the operations of 1825 may be performed by a feedback message manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a configuration signal identifying a scheduling constraint for the UE, the scheduling constraint for downlink feedback messages associated with a dynamic codebook configuration and scheduled using a first DCI format; receiving a first DCI having the first DCI format; determining, based at least in part on the first DCI format, that the scheduling constraint is satisfied; and transmitting a feedback message for the first DCI based at least in part on the scheduling constraint being satisfied.

Aspect 2: The method of aspect 1, further comprising: identifying a size configuration for a counter DAI in the first DCI format comprises a zero-bit downlink assignment counter.

Aspect 3: The method of aspect 2, further comprising: receiving a second DCI having the first DCI format; determining, based at least in part on the second DCI, that a first feedback message for the first DCI is to be multiplexed with a second feedback message for the second DCI; determining, based at least in part on the first DCI format of the first DCI, that the second DCI does not satisfy the scheduling constraint; and determining, based at least in part on the second DCI not satisfying the scheduling constraint, that a scheduling error has occurred.

Aspect 4: The method of any of aspects 2 through 3, further comprising: receiving a second DCI; determining, based at least in part on the second DCI, that a first feedback message for the first DCI is to be multiplexed with a second feedback message for the second DCI; determining, based at least in part on the first DCI format of the first DCI, that the second DCI does not satisfy the scheduling constraint; and determining, based at least in part on the second DCI not satisfying the scheduling constraint, that a scheduling error has occurred.

Aspect 5: The method of any of aspects 2 through 4, further comprising: receiving a second DCI; determining, based at least in part on the second DCI, that the feedback message for the first DCI and a second feedback message for the second DCI are to be transmitted separately; and transmitting the feedback message for the first DCI and the second feedback message for the second DCI satisfying a scheduling constraint.

Aspect 6: The method of any of aspects 1 through 5, wherein a size configuration for a counter downlink assignment indicator in the first downlink control information format comprise a one-bit downlink assignment counter.

Aspect 7: The method of aspect 6, further comprising: receiving a second DCI having a second DCI format, the second DCI comprising a different DAI size than the first DCI format; determining, based at least in part on the second DCI, that a first feedback message for the first DCI is to be multiplexed with a second feedback message for the second DCI; determining, based at least in part on the second DCI format for the second DCI, that the scheduling constraint is not satisfied; and determining, based at least in part on the second DCI not satisfying the scheduling constraint, that a scheduling error has occurred.

Aspect 8: The method of any of aspects 6 through 7, further comprising: receiving a second DCI having the first DCI format; determining, based at least in part on the first DCI format for the second DCI, that the second DCI satisfies the scheduling constraint; and transmitting the feedback message for the first DCI and the second DCI based at least in part on the scheduling constraint being satisfied.

Aspect 9: The method of any of aspects 1 through 8, further comprising: receiving a second DCI having a second DCI format, wherein a size configuration for a DAI in the first DCI format is associated with either a zero-bit or a one-bit downlink assignment counter and the size configuration for the DAI in the second DCI format is associated with a two-bit downlink assignment counter; determining that the feedback message for the first DCI is to be multiplexed with a second feedback message for the second DCI; determining that the second DCI having the second DCI format is received after the first DCI having the first DCI format; and determining, based at least in part on the first DCI format of the first DCI being received before the second DCI format of the second DCI, that the second DCI satisfies the scheduling constraint.

Aspect 10: The method of aspect 9, further comprising: incrementing a total DAI value associated with the first DCI and the second DCI based at least in part on a first counter DAI indicated in the first DCI and a second counter DAI indicated in the second DCI.

Aspect 11: The method of any of aspects 1 through 10, wherein the first DCI format is used to schedule a PDSCH reception, or indicate a semi-persistent resource PDSCH release, or indicate SCell dormancy without scheduling a PDSCH reception.

Aspect 12: A method for wireless communication at a base station, comprising: transmitting a configuration signal identifying a scheduling constraint for a UE, the scheduling constraint for downlink feedback messages associated with a dynamic codebook configuration and scheduled using a first DCI format; transmitting a first DCI having the first DCI format; and; and receiving a feedback message for the first DCI based at least in part on the first DCI satisfying the scheduling constraint.

Aspect 13: The method of aspect 12, further comprising: refraining from transmitting DCI having a second DCI format based at least in part on the scheduling constraint.

Aspect 14: The method of any of aspects 12 through 13, wherein the first DCI format is used to schedule a PDSCH reception, or indicate a semi-persistent resource PDSCH release, or indicate SCell dormancy without scheduling a PDSCH reception.

Aspect 15: An apparatus for wireless communication at a UE, comprising a processor; memory coupled with the processor; and instructions stored in the memory and executable by the processor to cause the apparatus to perform a method of any of aspects 1 through 11.

Aspect 17: An apparatus for wireless communication at a UE, comprising at least one means for performing a method of any of aspects 1 through 11.

Aspect 19: A non-transitory computer-readable medium storing code for wireless communication at a UE, the code comprising instructions executable by a processor to perform a method of any of aspects 1 through 20.

Aspect 21: An apparatus for wireless communication at a base station, comprising a processor; memory coupled with the processor; and instructions stored in the memory and executable by the processor to cause the apparatus to perform a method of any of aspects 12 through 22.

Aspect 23: An apparatus for wireless communication at a base station, comprising at least one means for performing a method of any of aspects 12 through 24.

Aspect 25: A non-transitory computer-readable medium storing code for wireless communication at a base station, the code comprising instructions executable by a processor to perform a method of any of aspects 12 through 24.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration signal identifying a scheduling expectation for the UE, the scheduling expectation for feedback messages associated with a dynamic codebook configuration and scheduled using a first downlink control information format, wherein the scheduling expectation is based at least in part on a quantity of bits of a counter downlink assignment indicator;
   receiving a first downlink control information having the first downlink control information format, the first downlink control information scheduling a first downlink transmission;
   determining, based at least in part on the quantity of bits of the counter downlink assignment indicator for the first downlink control information format, that the scheduling expectation is satisfied; and
   transmitting a first feedback message for the first downlink transmission based at least in part on the scheduling expectation being satisfied, wherein the scheduling expectation comprises that the UE does not expect to multiplex the first feedback message with a second feedback message for a second downlink transmission based at least in part on the quantity of bits of the counter downlink assignment indicator.

2. The method of claim 1, further comprising:
   identifying a size configuration for the counter downlink assignment indicator in the first downlink control information format comprises a zero-bit downlink assignment counter, wherein the UE does not expect to be scheduled with more than one bit hybrid automatic repeat/request-acknowledgement (HARQ-ACK) based at least in part on the zero-bit downlink assignment counter.

3. The method of claim 2, further comprising:
   receiving a second downlink control information having the first downlink control information format, the second downlink control information scheduling the second downlink transmission;
   determining, based at least in part on the second downlink control information, that the first feedback message for the first downlink transmission is to be multiplexed with the second feedback message for the second downlink transmission;
determining, based at least in part on the first downlink control information format of the first downlink control information, that the second downlink control information does not satisfy the scheduling expectation; and
determining, based at least in part on the second downlink control information not satisfying the scheduling expectation, that a scheduling error has occurred.

4. The method of claim 2, further comprising:
receiving a second downlink control information scheduling the second downlink transmission;
determining, based at least in part on the second downlink control information, that the first feedback message for the first downlink transmission is to be multiplexed with the second feedback message for the second downlink transmission;
determining, based at least in part on the first downlink control information format of the first downlink control information, that the second downlink control information does not satisfy the scheduling expectation; and
determining, based at least in part on the second downlink control information not satisfying the scheduling expectation, that a scheduling error has occurred.

5. The method of claim 1, further comprising:
receiving a second downlink control information scheduling the second downlink transmission;
determining, based at least in part on the second downlink control information, that the first feedback message for the first downlink transmission and the second feedback message for the second downlink transmission are to be transmitted separately;
determining that the second downlink control information satisfies the scheduling expectation; and
transmitting the first feedback message for the first downlink control information and the second feedback message for the second downlink control information based at least in part on the first downlink control information and the second downlink control information satisfying the scheduling expectation.

6. The method of claim 1, wherein a size configuration for the counter downlink assignment indicator in the first downlink control information format comprise a one-bit downlink assignment counter.

7. The method of claim 6, further comprising:
receiving a second downlink control information having a second downlink control information format, the second downlink control information scheduling the second downlink transmission, the second downlink control information comprising a different downlink assignment indicator size than the first downlink control information format;
determining, based at least in part on the second downlink control information, that the first feedback message for the first downlink transmission is to be multiplexed with the second feedback message for the second downlink transmission;
determining, based at least in part on the second downlink control information format for the second downlink control information, that the scheduling expectation is not satisfied; and
determining, based at least in part on the second downlink control information not satisfying the scheduling expectation, that a scheduling error has occurred.

8. The method of claim 6, further comprising:
receiving a second downlink control information having the first downlink control information format, the second downlink control information scheduling the second downlink transmission;
determining, based at least in part on the first downlink control information format for the second downlink control information, that the second downlink control information satisfies the scheduling expectation; and
transmitting the first feedback message for the first downlink control information and the second downlink control information based at least in part on the scheduling expectation being satisfied.

9. The method of claim 1, further comprising:
receiving a second downlink control information having a second downlink control information format, the second downlink control information scheduling the second downlink transmission, wherein a size configuration for a downlink assignment indicator in the first downlink control information format is associated with either a zero-bit or a one-bit downlink assignment counter and the size configuration for the downlink assignment indicator in the second downlink control information format is associated with a two-bit downlink assignment counter;
determining that the first feedback message for the first downlink transmission is to be multiplexed with the second feedback message for the second downlink transmission;
determining that the second downlink control information having the second downlink control information format is received after the first downlink control information having the first downlink control information format; and
determining, based at least in part on the first downlink control information format of the first downlink control information being received before the second downlink control information format of the second downlink control information, that the second downlink control information satisfies the scheduling expectation.

10. The method of claim 9, further comprising:
incrementing a total downlink assignment indicator value associated with the first downlink control information and the second downlink control information based at least in part on a first counter downlink assignment indicator indicated in the first downlink control information and a second counter downlink assignment indicator indicated in the second downlink control information.

11. The method of claim 1, wherein the first downlink control information format is used to schedule a physical downlink shared channel (PDSCH) reception, or indicate a semi-persistent resource PDSCH release, or indicate secondary cell (SCell) dormancy without scheduling a PDSCH reception.

12. A method for wireless communication at a network device, comprising:
transmitting a configuration signal identifying a scheduling expectation for a user equipment (UE), the scheduling expectation for feedback messages associated with a dynamic codebook configuration and scheduled using a first downlink control information format, wherein the scheduling expectation is based at least in part on a quantity of bits of a counter downlink assignment indicator;

transmitting a first downlink control information having the first downlink control information format, the first downlink control information scheduling a first downlink transmission; and receiving a first feedback message for the first downlink transmission based at least in part on the scheduling expectation being satisfied, wherein the scheduling expectation comprises that the UE does not expect to multiplex the first feedback message with a second feedback message for a second downlink transmission based at least in part on the quantity of bits of the counter downlink assignment indicator.

13. The method of claim 12, further comprising:
refraining from transmitting a second downlink control information having a second downlink control information format based at least in part on the scheduling expectation.

14. The method of claim 12, wherein the first downlink control information format is used to schedule a physical downlink shared channel (PDSCH) reception, or indicate a semi-persistent resource PDSCH release, or indicate secondary cell (SCell) dormancy without scheduling a PDSCH reception.

15. An apparatus for wireless communication at a user equipment (UE), comprising:
one or more memories storing processor-executable code; and
one or more processors coupled with the one or more memories and individually or collectively operable to execute the code to cause the apparatus to:
receive a configuration signal identifying a scheduling expectation for the UE, the scheduling expectation for feedback messages associated with a dynamic codebook configuration and scheduled using a first downlink control information format, wherein the scheduling expectation is based at least in part on a quantity of bits of a counter downlink assignment indicator;
receive a first downlink control information having the first downlink control information format, the first downlink control information scheduling a first downlink transmission;
determine, based at least in part on the quantity of bits of the counter downlink assignment indicator for the first downlink control information format, that the scheduling expectation is satisfied; and
transmit a first feedback message for the first downlink transmission based at least in part on the scheduling expectation being satisfied, wherein the scheduling expectation comprises that the UE does not expect to multiplex the first feedback message with a second feedback message for a second downlink transmission based at least in part on the quantity of bits of the counter downlink assignment indicator.

16. The apparatus of claim 15, wherein the one or more processors are individually or collectively further operable to execute the code to cause the apparatus to:
identify a size configuration for the counter downlink assignment indicator in the first downlink control information format comprises a zero-bit downlink assignment counter, wherein the UE does not expect to be scheduled with more than one bit hybrid automatic repeat/request-acknowledgement (HARQ-ACK) based at least in part on the zero-bit downlink assignment counter.

17. The apparatus of claim 16, wherein the one or more processors are individually or collectively further operable to execute the code to cause the apparatus to:

receive a second downlink control information having the first downlink control information format, the second downlink control information scheduling the second downlink transmission;
determine, based at least in part on the second downlink control information, that the first feedback message for the first downlink transmission is to be multiplexed with the second feedback message for the second downlink transmission;
determine, based at least in part on the first downlink control information format of the first downlink control information, that the second downlink control information does not satisfy the scheduling expectation; and
determine, based at least in part on the second downlink control information not satisfying the scheduling expectation, that a scheduling error has occurred.

18. The apparatus of claim 16, the one or more processors are individually or collectively further operable to execute the code to cause the apparatus to:
receive a second downlink control information, the second downlink control information scheduling the second downlink transmission;
determine, based at least in part on the second downlink control information, that the first feedback message for the first downlink transmission is to be multiplexed with the second feedback message for the second downlink transmission;
determine, based at least in part on the first downlink control information format of the first downlink control information, that the second downlink control information does not satisfy the scheduling expectation; and
determine, based at least in part on the second downlink control information not satisfying the scheduling expectation, that a scheduling error has occurred.

19. The apparatus of claim 15, the one or more processors are individually or collectively further operable to execute the code to cause the apparatus to:
receive a second downlink control information, the second downlink control information scheduling the second downlink transmission;
determine, based at least in part on the second downlink control information, that the first feedback message for the first downlink transmission and the second feedback message for the second downlink transmission are to be transmitted separately; and
transmit the first feedback message for the first downlink control information and the second feedback message for the second downlink control information based at least in part on the first downlink control information and the second downlink control information satisfying the scheduling expectation.

20. The apparatus of claim 15, wherein a size configuration for the counter downlink assignment indicator in the first downlink control information format comprise a one-bit downlink assignment counter.

21. The apparatus of claim 20, the one or more processors are individually or collectively further operable to execute the code to cause the apparatus to:
receive a second downlink control information having a second downlink control information format, the second downlink control information scheduling the second downlink transmission, the second downlink control information comprising a different downlink assignment indicator size than the first downlink control information format;
determine, based at least in part on the second downlink control information, that the first feedback message for the first downlink transmission is to be multiplexed with the second feedback message for the second downlink transmission;

determine, based at least in part on the second downlink control information format for the second downlink control information, that the scheduling expectation is not satisfied; and determine, based at least in part on the second downlink control information not satisfying the scheduling expectation, that a scheduling error has occurred.

22. The apparatus of claim 20, the one or more processors are individually or collectively further operable to execute the code to cause the apparatus to:

receive a second downlink control information having the first downlink control information format, the second downlink control information scheduling the second downlink transmission;

determine, based at least in part on the first downlink control information format for the second downlink control information, that the second downlink control information satisfies the scheduling expectation; and transmit the first feedback message for the first downlink control information and the second downlink control information based at least in part on the scheduling expectation being satisfied.

23. The apparatus of claim 15, the one or more processors are individually or collectively further operable to execute the code to cause the apparatus to:

receive a second downlink control information having a second downlink control information format, the second downlink control information scheduling the second downlink transmission, wherein a size configuration for a downlink assignment indicator in the first downlink control information format is associated with either a zero-bit or a one-bit downlink assignment counter and the size configuration for the downlink assignment indicator in the second downlink control information format is associated with a two-bit downlink assignment counter;

determine that the first feedback message for the first downlink transmission is to be multiplexed with the second feedback message for the second downlink transmission; and determine, based at least in part on the first downlink control information format of the first downlink control information and the second downlink control information format of the second downlink control information, that the second downlink control information satisfies the scheduling expectation.

24. The apparatus of claim 23, the one or more processors are individually or collectively further operable to execute the code to cause the apparatus to:

increment a total downlink assignment indicator value associated with the first downlink control information and the second downlink control information based at least in part on a first counter downlink assignment indicator indicated in the first downlink control information and a second counter downlink assignment indicator indicated in the second downlink control information.

25. The apparatus of claim 15, wherein the first downlink control information format is used to schedule a physical downlink shared channel (PDSCH) reception, or indicate a semi-persistent resource PDSCH release, or indicate secondary cell (SCell) dormancy without scheduling a PDSCH reception.

26. An apparatus for wireless communication at a network device, comprising:

one or more memories storing processor-executable code; and one or more processors coupled with the one or more memories and individually or collectively operable to execute the code to cause the apparatus to:

transmit a configuration signal identifying a scheduling expectation for a user equipment (UE), the scheduling expectation for downlink feedback messages associated with a dynamic codebook configuration and scheduled using a first downlink control information format, wherein the scheduling expectation is based at least in part on a quantity of bits of a counter downlink assignment indicator;

transmit a first downlink control information having the first downlink control information format, the first downlink control information scheduling a first downlink transmission; and receive a first feedback message for the first downlink transmission based at least in part on the scheduling expectation being satisfied, wherein the scheduling expectation comprises that the UE does not expect to multiplex the first feedback message with a second feedback message for a second downlink transmission based at least in part on the quantity of bits of the counter downlink assignment indicator.

27. The apparatus of claim 26, the one or more processors are individually or collectively further operable to execute the code to cause the apparatus to:

refrain from transmitting a second downlink control information having a second downlink control information format based at least in part on the scheduling expectation.

28. The apparatus of claim 26, wherein the first downlink control information format is used to schedule a physical downlink shared channel (PDSCH) reception, or indicate a semi-persistent resource PDSCH release, or indicate secondary cell (SCell) dormancy without scheduling a PDSCH reception.

29. The method of claim 1, further comprising:

receiving a second downlink control information, the second downlink control information comprising a different counter downlink assignment indicator size that the first downlink control information, wherein the UE does not expect to be scheduled with hybrid automatic repeat/request-acknowledgement (HARQ-ACK) corresponding to the first downlink control information and the second downlink control information in a same feedback message.

30. The apparatus of claim 15, the one or more processors are individually or collectively further operable to execute the code to cause the apparatus to:

receive a second downlink control information, the second downlink control information comprising a different counter downlink assignment indicator size that the first downlink control information, wherein the UE does not expect to be scheduled with hybrid automatic repeat/request-acknowledgement (HARQ-ACK) corresponding to the first downlink control information and the second downlink control information in a same feedback message.

* * * * *